United States Patent
Elmer

(10) Patent No.: US 11,842,169 B1
(45) Date of Patent: Dec. 12, 2023

(54) SYSTOLIC MULTIPLY DELAYED ACCUMULATE PROCESSOR ARCHITECTURE

(71) Applicant: Amazon Technologies, Inc., Seattle, WA (US)

(72) Inventor: Thomas Elmer, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 658 days.

(21) Appl. No.: 16/582,918

(22) Filed: Sep. 25, 2019

(51) Int. Cl.
| | |
|---|---|
| G06F 7/544 | (2006.01) |
| G06F 7/501 | (2006.01) |
| G06F 9/30 | (2018.01) |
| G06F 9/38 | (2018.01) |
| G06F 15/80 | (2006.01) |

(52) U.S. Cl.
CPC ............ *G06F 7/5443* (2013.01); *G06F 7/501* (2013.01); *G06F 9/30069* (2013.01); *G06F 9/30076* (2013.01); *G06F 9/30101* (2013.01); *G06F 9/3869* (2013.01); *G06F 9/3893* (2013.01); *G06F 15/8046* (2013.01)

(58) Field of Classification Search
CPC .... G06F 7/5443; G06F 7/501; G06F 9/30069; G06F 9/30076; G06F 9/30101; G06F 9/3869; G06F 9/3893; G06F 15/8046
See application file for complete search history.

(56) References Cited

U.S. PATENT DOCUMENTS

| | | |
|---|---|---|
| 4,937,774 A | 6/1990 | Malinowski |
| 5,138,695 A | 8/1992 | Means |
| 5,151,953 A | 9/1992 | Landeta |
| 5,168,499 A | 12/1992 | Peterson |
| 5,659,781 A | 8/1997 | Larson |
| 5,692,147 A | 11/1997 | Larsen |
| 6,205,462 B1 | 3/2001 | Wyland |

(Continued)

FOREIGN PATENT DOCUMENTS

| | | |
|---|---|---|
| EP | 3396524 | 10/2018 |
| WO | WO 94/10638 | 5/1994 |

(Continued)

OTHER PUBLICATIONS

Kung et al., *Systolic Arrays for VLSI*, Dept. of Computer Science, Carnegie Mellon, Pittsburgh (Apr. 1978).

(Continued)

*Primary Examiner* — Shawn Doman
(74) *Attorney, Agent, or Firm* — Knobbe, Martens, Olson & Bear LLP

(57) ABSTRACT

Systems and methods are provided to perform multiplication-delayed-addition operations in a systolic array to increase clock speeds, reduce circuit area, and/or reduce dynamic power consumption. Each processing element in the systolic array can have a pipeline configured to perform a multiplication during a first systolic interval and to perform an accumulation during a second systolic interval. The multiplication result from the first systolic interval can be stored in a delay register for use by the accumulator during the second systolic interval. A skip detection circuit can be used to skip one or more of the multiplication, storing in the delay register, and the addition during skip conditions for improved energy efficiency.

20 Claims, 15 Drawing Sheets

(56) References Cited

U.S. PATENT DOCUMENTS

| | | | |
|---|---|---|---|
| 6,463,453 B1* | 10/2002 | Dang | G06F 7/5443 |
| | | | 708/628 |
| 6,480,872 B1 | 11/2002 | Choquette | |
| 6,801,924 B1 | 10/2004 | Green et al. | |
| 7,814,137 B1 | 10/2010 | Mauer | |
| 8,184,696 B1 | 5/2012 | Chirila-Rus | |
| 8,924,455 B1 | 12/2014 | Barman | |
| 10,790,830 B1 | 9/2020 | Pugh | |
| 10,817,260 B1 | 10/2020 | Huang | |
| 10,872,295 B1 | 12/2020 | Liu | |
| 10,879,904 B1 | 12/2020 | Gunter | |
| 10,915,297 B1* | 2/2021 | Halutz | G06F 17/16 |
| 11,113,233 B1 | 9/2021 | Volpe | |
| 11,232,062 B1 | 1/2022 | Volpe | |
| 11,308,026 B1 | 4/2022 | Volpe et al. | |
| 11,308,027 B1 | 4/2022 | Volpe et al. | |
| 11,422,773 B1 | 8/2022 | Volpe et al. | |
| 11,467,806 B2 | 10/2022 | Elmer | |
| 2003/0081489 A1 | 5/2003 | Scheuerlein | |
| 2004/0139274 A1 | 7/2004 | Hui | |
| 2006/0149803 A1 | 7/2006 | Siu | |
| 2007/0028076 A1 | 2/2007 | Wezelenburg | |
| 2007/0185953 A1* | 8/2007 | Prokopenko | G06F 9/3885 |
| | | | 708/523 |
| 2009/0248769 A1* | 10/2009 | Chua | G06F 7/5443 |
| | | | 708/209 |
| 2011/0025900 A1 | 2/2011 | Kondo | |
| 2011/0058569 A1 | 3/2011 | Harrand | |
| 2011/0225116 A1 | 9/2011 | Gupta et al. | |
| 2016/0342890 A1 | 11/2016 | Young | |
| 2016/0342892 A1 | 11/2016 | Ross | |
| 2017/0097824 A1* | 4/2017 | Elmer | G06F 9/3893 |
| 2017/0103311 A1 | 4/2017 | Henry | |
| 2017/0115958 A1* | 4/2017 | Langhammer | G06F 7/57 |
| 2017/0235515 A1 | 8/2017 | Lea | |
| 2018/0036165 A1 | 2/2018 | Fallon | |
| 2018/0164866 A1* | 6/2018 | Turakhia | G06N 3/063 |
| 2018/0225116 A1 | 8/2018 | Henry | |
| 2018/0314671 A1 | 11/2018 | Zhang | |
| 2018/0315398 A1* | 11/2018 | Kaul | G06N 3/0445 |
| 2018/0336163 A1 | 11/2018 | Phelps | |
| 2018/0336164 A1 | 11/2018 | Phelps et al. | |
| 2018/0336165 A1 | 11/2018 | Phelps | |
| 2019/0026077 A1* | 1/2019 | Manzo | G06F 9/30014 |
| 2019/0041961 A1* | 2/2019 | Desai | G06N 3/0481 |
| 2019/0079801 A1 | 3/2019 | Lyuh | |
| 2019/0138882 A1 | 5/2019 | Choi | |
| 2019/0236049 A1 | 8/2019 | Vantrease | |
| 2019/0294413 A1 | 9/2019 | Vantrease | |
| 2019/0311243 A1 | 10/2019 | Whatmough | |
| 2019/0385050 A1 | 12/2019 | Wang | |
| 2020/0026497 A1* | 1/2020 | Park | G06F 7/5443 |
| 2020/0117988 A1 | 4/2020 | Arthur | |
| 2020/0150958 A1 | 5/2020 | Ahmed | |
| 2020/0159809 A1 | 5/2020 | Catthoor et al. | |
| 2020/0192701 A1 | 6/2020 | Horowitz | |
| 2020/0201576 A1 | 6/2020 | Yudanov | |
| 2020/0226473 A1* | 7/2020 | Sharma | G06N 3/063 |
| 2020/0302298 A1 | 9/2020 | Willem | |
| 2020/0349106 A1* | 11/2020 | Ovsiannikov | G06F 15/78 |
| 2021/0019591 A1 | 1/2021 | Venkatesh | |
| 2021/0042087 A1 | 2/2021 | Pugh | |
| 2021/0064985 A1 | 3/2021 | Sun | |
| 2021/0089316 A1 | 3/2021 | Rash | |
| 2021/0091794 A1 | 3/2021 | Snelgrove | |
| 2021/0157548 A1 | 5/2021 | Elmer | |
| 2021/0157549 A1 | 5/2021 | Elmer | |
| 2022/0350775 A1 | 11/2022 | Volpe | |
| 2023/0004384 A1 | 1/2023 | Meyer et al. | |
| 2023/0004523 A1 | 1/2023 | Meyer et al. | |
| 2023/0010054 A1 | 1/2023 | Elmer | |

FOREIGN PATENT DOCUMENTS

| | | |
|---|---|---|
| WO | WO 2021/108644 | 6/2021 |
| WO | WO 2021/108660 | 6/2021 |

OTHER PUBLICATIONS

Kung, *Let's Design Algorithms for VLSI Systems*, Dept. of Computer Science, Carnegie Mellon Univ Pittsburgh (Jan. 1979).

Search Report and Written Opinion dated Mar. 4, 2021, issued in PCT/US2020/062337.

Search Report and Written Opinion dated Mar. 4, 2021, Issued in PCT/US2020/062356.

Arnould, E., et al., A Systolic Array Computer., 1985, IEEE., pp. 232-235. (Year: 1985).

Bao, Wenqi, et al., A Reconfigurale Macro-Pipelined Systolic Accelerator Architecture, 2011, IEEE., 6 pages. (Year: 2011).

Dick, Chris, Computing the Discrete Fourier Transform on FPGA Based Systolic Arrays, 1996, ACM, 7 pages. (Year: 1996).

Garland, J. et al., Low Complexity Multiply-Accumulate Units for Convolutional Neural Networks with Weight Sharing, 2018, ACM, 24 pages. (Year: 2018).

Hu, Hen Yu., et al. Systolic Arrays, 2019, Spring intl. Publishing, pp. 939-977. (Year: 2019).

Hu, Hen Yu, et al., Systolic Arrays, 2018, SpringerLink, Handbook or Signal Processing Systems, pp. 939-977. (Year: 2018).

Kung, H.T. et al., Packing Sparse Convolutional Neural Networks for Efficient Systolic Array Implementations: Column Combining Under Joint Optimization, Apr. 2019, ACM, pp. 821-834. (Year: 2019).

Kung, H.T., Why Systolic Architectures?, 1982,IEEE, pp. 37-48. (Year 1982).

Liu, B. et al., An Energy-Efficient Systolic Pipelin Architecture for Binary Conbolutional Neural Network, 2019, IEEE, 4 pages. (Year: 2019).

Wah, B, W. et al. Systolic Programming for Dynamic Programming Problems, 1999, Circuits Systems Signal Processing vol. 7, No. 2, pp. 119-149. (Year:1999).

Pedram , A. et al. A High performance, Low Power Linear Algebra Core, 2011, IEEE, pp. 35-42 (Year: 2011).

U.S. Appl. No. 16/915,937, Multiple Busses Within a Systolic Array Processing Element, filed Jun. 29, 2020.

Yang, Z. et al., "Systolic Array Based Accelerator and Algorithm Mapping for Deep Learning Algorithms", Network and Parallel Computing, 2018, pp. 153-158.

\* cited by examiner

SYSTOLIC MULTIPLY DELAYED ACCUMULATE PROCESSOR ARCHITECTURE

BACKGROUND

Artificial neural networks are computing systems with an architecture based on biological neural networks. Generally, implementation of artificial neural networks includes two phases: a training phase and an interference phase. During training, a training data set is passed through a network structure, and elements of the structure are weighted in an attempt to achieve a task, such as prediction of an outcome based on inputs from the training data set. The training phase results in a trained model, into which new inputs can be passed to obtain a predicted result. This application of new inputs to a trained model is referred to as inference. Generally, training of a neural network is time-insensitive, in that it can occur over whatever period of time is necessary to train the model. In contrast, inference is often time sensitive, in that the predicted result is used in user-facing applications where latency can negatively impact experience.

One mechanism for implementing interference based on a trained neural network is the use of a systolic array, which can comprise an array of processing elements capable of performing concurrent arithmetic operations. The array can be initialized with weights corresponding to the trained network, and interference can occur by passing input data into and through the array to result in an output. Because of the time-sensitivity of interference, it is generally desirable that such arrays operate as quickly as possible. However, increases in clock speed can often result in detrimental increases in power consumption, processor size, required cooling, and the like, limiting these increases.

BRIEF DESCRIPTION OF THE DRAWINGS

Various examples in accordance with the present disclosure will be described with reference to the drawings, in which.

DETAILED DESCRIPTION

Figure 1:
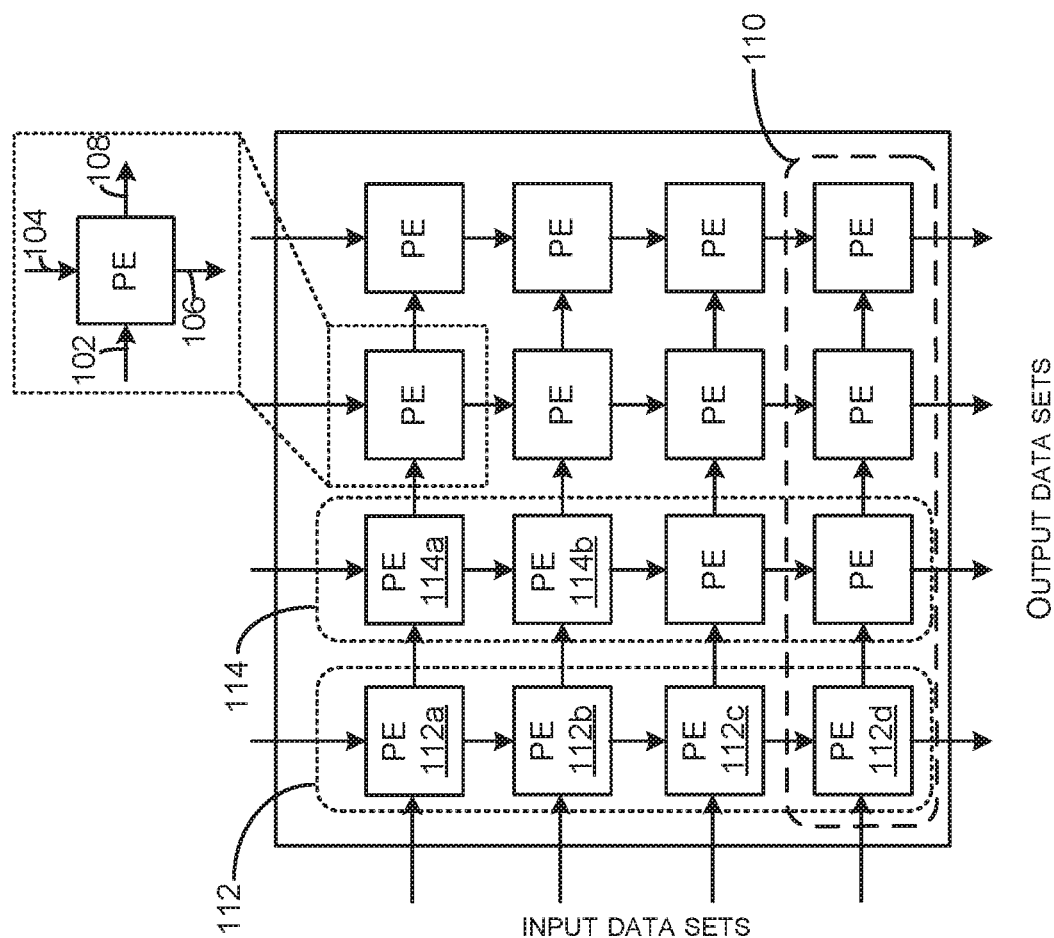
FIG. 1 illustrates an example 4×4 systolic array.

In the following description, various examples will be described. For purposes of explanation, specific configurations and details are set forth in order to provide a thorough understanding of the examples. However, it will also be apparent to one skilled in the art that the examples may be practiced without the specific details.

A convolutional neural network (CNN) is generally a feed-forward artificial neural network, which may include multiple intermediate layers, and an output from one layer may be used as an input to the next layer. Systolic arrays may be used to accelerate the workload in neural networks by reading the data from the memory once, and reusing it in multiple computations. A systolic array may be implemented using a two-dimensional or multi-dimensional array of processing elements (PEs). In some examples, the PEs can be divided into layers including, e.g., an input layer, a number of intermediate layers (also known as hidden layers), and an output layer.

Generally, an input data set (e.g., an input feature map) may be fed, one input data element at a time, into its respective row of the systolic array, and passed from one PE to another PE in a given row starting from a leftmost PE. In some implementations, the weights may be cached in the respective PEs. As the input data element passes through a PE, the input data element can be multiplied with the cached weight value, and accumulated with a partial sum provided by a neighboring PE in a row above.

The PE's can be configured to perform multiply-delayed-accumulate operations. For example, the PE's can be configured to compute (IDE×W+IPS), where IDE is an input data element, W is a weight, and IPS is an input partial sum. The multiplication of IDE× W yields a multiplication result. The multiplication result is accumulated with (e.g., added to) the IPS.

The multiplication can be performed by a PE during a first systolic interval, and the accumulation can be performed by the PE during a subsequent systolic interval. A delay register can store the multiplication result from the multiplier for the accumulator to read and use in the subsequent systolic interval. By pipelining the multiply and accumulate operations in different systolic intervals, the area of each PE can be reduced, each PE can be made more energy efficient, the speed of each systolic interval can be increased, and/or any combination thereof. Examples of the multiply-delayed-accumulate operations are illustrated with respect to FIGS. 9A-9E.

In an example implementation, a multiply-delayed-accumulate architecture realized about 25%-35% area savings and about 25%-50% power savings in comparison to a multiply-accumulate architecture of similar clock speed. Improved performance, power, and area (e.g., in Watts/mm or terra-operations/Joule) can be achieved. A multiply-delayed-accumulate architecture may take an additional systolic interval in comparison to a multiply-accumulate architecture when generating a first output due to filling up a pipeline. However, the additional latency is minor in comparison to the speed performances that can be gained by improved clock speeds. The sequence of multiplying and sequentially accumulating takes a significant period of time. By separating the multiplication and the accumulation into different systolic intervals, the duration of the systolic interval can be reduced (the clock speed can be increased). Some examples of multiply-delayed-accumulate architectures can include circuitry configured to multiply, store, and/or accumulate integer, floating point, reduced precision floating point, double, or other data formats.

In most implementations, the systolic array may include a large number of PEs (e.g., several thousands), therefore dynamic power consumption can become critical due to the multiply-delayed-accumulate operations performed by the large numbers of PEs in the systolic array concurrently. Accordingly, additional power saving technologies can optionally be implemented to reduce the power consumption in systolic multiply-delayed accumulate architectures.

A common CNN may generally have several weights as well as input data elements with a value of zero. Additionally, a number of data elements generated by the intermediate layers may include a zero value due to the commonly used activation functions such as ReLu or Sigmoid. In these cases, the multiplication operation may generate a zero result due to multiplication with a zero value. The zero result accumulated with a partial sum may not alter the functional result, however, the multiply-delayed-accumulate operation may waste dynamic power since the multiplication operation is still being performed.

A systolic array can dynamically reduce power consumption by skipping multiplication operations in a first systolic interval and skipping delayed accumulation operations in a subsequent systolic interval in a PE under certain skip conditions. The skip conditions can include the input data element being zero, a weight being zero, and/or a no-operation (NOP). If a skip condition is detected, the multiplication operation can be skipped in a first systolic interval when a zero is detected on an input data element for a current multiply-delayed-accumulate operation or a no-operation (NOP) is received by a PE, the storing of the multiplication result can be skipped, and the delayed accumulate operation can be skipped in a second systolic interval.

For example, the skip condition can be detected based on NOPs. Each PE may receive an opcode indicating an operation to be executed by the PE. The PE may decode the opcode to determine if the opcode value corresponds to a NOP to detect the skip condition.

As another example, the skip condition can be detected based on zero input data. A value of zero on an input data element may be detected by respective zero input data detector circuits for each row of the systolic array to detect the skip condition as the input data element enters the systolic array. A value of zero may correspond to a logical zero or a logical low, and a value of one may correspond to a logical one or a logical high. For example, in some implementations, the logical zero may be represented by a first range of voltage levels (e.g., 0-2 volts), and the logical one may be represented by a second range of voltage levels (e.g., 3-5 volts). The respective zero input data detector circuits may generate a zero input data indicator signal for each row, which may be sequentially passed to all the PEs in that row.

As another example, the skip condition can be detected based on a zero weight. A respective weight value may be pre-loaded in each PE of the systolic array. For each row of the systolic array, a respective zero weight detector circuit may be used to detect a value of zero on each weight value entering the respective row and generate a respective zero weight indicator signal for each weight value. The respective zero weight indicator signals may be sequentially passed to subsequent PEs in each row along with a corresponding weight value and may be cached in a respective PE for each column. Thus, instead of having respective zero detector circuits in each PE, examples of the disclosed technologies can reduce the gate count and dynamic power consumption by having the zero detector circuits that are external to the PEs, and can be used by all the PEs in a given row.

The zero input data indicator and/or an opcode indicating a NOP may be used to gate a data register in each PE, which receives and stores the value of the next input data element. Thus, during a first systolic interval when a zero input data indicator is asserted indicating that an input data element associated with the zero input data indicator is "0", or when the opcode indicates a NOP, the data register may continue to store a previous (and now possibly stale) value of the input data element. A stored value of the input data element may be sequentially passed to other PEs in that row along with the respective zero input data indicator signal during nonzero operations. However, in cases where the input data element is zero, a zero value of the input data element does not need to be stored in the data register, and the zero value does not need to be passed as an input data element to other PEs in that row. In place of passing the zero value to other PEs in that row, a zero input data indicator can be propagated to the other PEs in that row. When the zero input data indicator is asserted or the opcode indicates a NOP, the stored value of the input data element may not toggle or update, thereby saving energy. A multiplier in each PE is configured to use the respective stored value of the input data element from the data register to perform the multiplication operation with a weight value cached in the respective PE. Since the weight may already be pre-loaded in the PE and the inputs to the multiplier may not change if the stored value of the input data element does not toggle or update, the multiplication operation may be skipped during the first systolic interval and the delayed accumulate operation can be skipped during a second systolic interval, thus reducing the dynamic power consumption by the PE for that multiply-delayed-accumulate operation. In such cases where stale values of the input data element are used, the multiply-delayed-accumulate operation may not necessarily provide a correct result, therefore, the multiply operation may be skipped during the first systolic interval, the result of the delayed-accumulate operation may be bypassed during the second systolic interval, and an input partial sum from a neighboring PE in a row above may be provided as an output partial sum to another neighboring PE in a row below during the second systolic interval.

FIG. 1 illustrates an example 4×4 systolic array 100. For example, the systolic array 100 may include four PEs in each row, and four PEs in each column. It will be understood that the systolic array 100 may include any number of PEs in each row and column. The systolic array 100 may be part of a neural network processor in a computer system. For example, the computer system may be configured to provide multi-tenant compute services for data processing applications such as an image recognition service, text-based data processing (e.g., processing of search queries), audio or video data processing, etc.

Each PE may include a row input bus 102, a column input bus 104, a column output bus 106, and a row output bus 108. A PE may receive inputs from a left PE of the same row (or from external circuitries) via the row input bus 102. The PE may also receive inputs from a PE of the same column above (or from external circuitries) via the column input bus 104. The PE may perform arithmetic computations based on the inputs over two or more systolic intervals and transmit the result of the arithmetic computations to a PE of the same column below (or to the external circuitries) via the column output bus 106. The PE may also forward the inputs received via the row input bus 102 to a right PE of the same row via the row output bus 108.

The systolic array 100 may be configured to perform the arithmetic computations, including multiplication and delayed addition operations, for the processing elements of a neural network. For example, each PE may include arithmetic units such as a multiplier and an adder. In the example of FIG. 1, each row of the PEs may be configured to handle one set of input data, and each column of the PEs may generate one set of output data based on the sets of input data received by each PE in a given column during each systolic interval after a first systolic interval.

A systolic interval is a time interval where complete or partial calculations are advanced in a systolic array. For example, during each systolic interval, processing elements can operate and communicate data to neighboring processing elements. For example, during a systolic interval a processing element can perform one or more of the following: receive new input data, perform computations such as multiplication or addition, read/write to registers, and generate new output data. Systolic intervals can be uniform time periods. A systolic interval can be determined according to a clock signal or other synchronization signal. One example of a common systolic interval is a full duty cycle of the clock signal. Other examples of systolic intervals can include a partial duty cycle of the clock signal such as uptick to downtick or downtick to uptick, or a systolic interval can last over multiple clock cycles. Systolic arrays generally include a plurality of processing elements that advance data in one or more designated, nonlinear paths through the processing elements based on the systolic intervals, and systolic arrays are different from standard, multicore, pipelined general purpose/graphical processor units.

In some implementations, a column 112 of the PEs (the leftmost column) may receive four sets of input data, with each set of input data being handled by one row of the PEs. Each PE in the column 112 may obtain, from the corresponding input data set received via the row input bus 102, an input data element and an associated weight value. The input data element can be multiplied with the weight value to generate a scaled input (also referred to as a product or as a multiplication result) during a first systolic interval. The scaled inputs generated by the PEs within any column (including the column 112) can be stored in a delay register for use during a second, subsequent systolic interval. During the second systolic interval, the scaled input stored in the delay register can be accumulated by the adder of each PE, which can include adding an input partial sum to the scaled input.

For example, a PE 112a (of the column 112) may generate a first scaled input (from the first input data set) during a first systolic interval, perform an accumulation during the second systolic interval, and transmit a partial sum to a PE 112b via the column output bus 106 during the second systolic interval. The PE 112b may also generate a second scaled input (from the second input data set) during the second systolic interval and add the second scaled input to the partial sum during a third systolic interval to generate an updated partial sum. The updated partial sum, accumulated with the first scaled input and the second scaled input, is then transmitted to a PE 112c via the column output bus 106 during the third systolic interval. The partial sums are updated during a fourth systolic interval and propagated down the column 112, and a PE 112d may generate a sum of the scaled inputs from the four input data sets during a fifth systolic interval.

The sum generated by the PE 112d may correspond to an output data set, and may be fed back to the leftmost PEs after going through an activation function.

Each PE in the column 112 can also propagate the input data sets to other PE columns (e.g., a column 114), which can scale the input data sets with a different set of weights from the column 112. Continuing the preceding example, PE 112a can, during the first systolic interval, communicate the input data element to PE 114a. During the second systolic interval, PE 114a can multiply the input data element by a weight value cached in PE 114a and communicate the input data element to a PE in the next column. A product resulting from the multiplication can be stored in a delay register in PE 114a for use during the third systolic interval. During the third systolic interval, PE 114a can accumulate the product with an input partial sum and transmit an output partial sum to PE 114b.

Each column of the PEs can perform the arithmetic operations (multiplications and summations) to generate the output data elements for other processing elements in parallel with other PEs. In the example of FIG. 1, the systolic array 100 can generate output data elements for four PEs corresponding to the four columns of the systolic array 100.

The systolic array 100 may perform convolution computations in multiple waves. A wave may be defined as streaming of input data elements while reusing the same weights in the systolic array 100. For example, the respective weights may have been pre-loaded in each PE in the systolic array 100, sequentially or in parallel prior to starting a wave computation. The partial sums generated by the PEs may correspond to a single wave. As the PEs of the systolic array 100 perform arithmetic operations for the convolution computations, dynamic power dissipated by all the multipliers in the PEs may be significant. This problem may be further exacerbated for a systolic array comprising a large number of PEs (e.g., several thousands). The arithmetic operations performed by a PE are further explained with reference to FIGS. 9A-9F and FIG. 2.

FIG. 9A-9E illustrate a 2×2 systolic array 900 for neural network computations processing multiply-delay-accumulate operations over systolic intervals 0 through 5 according to certain examples of the disclosed technologies. The systolic array 900 may be part of a larger systolic array similar to the systolic array 100 in FIG. 1 and can extend for any plurality of rows and any plurality columns. Some examples may be described with reference to neural networks, however it will be understood that certain examples may be used in other applications, e.g., pattern recognition, image processing, audio processing, video processing, etc., without deviating from the scope of the technologies.

The systolic array 900 includes four PEs labeled as PE00, PE01, PE10, and PE11 according to their row and column (RC) number. Each PERC respectively includes a data register Data RegRC for receiving an input data element, an input partial sum register IPS RegRC for receiving an input partial sum, a weight register storing a weight WRC, a multiplier represented by the "X," a delay register Delay RegRC, and an adder or accumulator represented by the "+". Values provided as input partial sums at systolic intervals 0-5 are shown along the top, with PE00 in column 0 receiving values A1 and A2 at the illustrated times and with PE01 in column 1 receiving values B1 and B2 at the illustrated times. Values provided as input data elements at systolic intervals 0-5 are shown along the left column, with PE00 in row 0 receiving values D1 and D2 at the illustrated times and with PE01 in row 1 receiving values d1 and d2 at the illustrated times. Where no value is illustrated, a zero or NOP can be assumed. Where indicated, the system is initialized with zero values for clarity and to facilitate understanding. However, other examples can occur at different states and/or with other internal values. Other example configurations for individual PEs may include technology discussed with respect to FIG. 2, FIG. 4, and FIG. 5.

FIG. 9A-9E show the progression of data as multiply-delay-accumulate operations are performed. The multiply-delay-accumulate operations include: multiplying weight W00 by data input element D1 and accumulating input partial sum A1; multiplying weight W00 data input element D2 and accumulating input partial sum A2, multiplying weight W01 by data input element D1 and accumulating input partial sum B1; multiplying weight W01 by data input element D2 and accumulating input partial sum B2; multiplying weight W10 by data input element d1 and accumulating a first input partial sum from PE00; multiplying weight W10 by data input element d2 and accumulating a second input partial sum from PE00; multiplying weight W11 by data input element d1 and accumulating a first input partial sum from PE01; and multiplying weight W11 by data input element d2 and accumulating a second input partial sum from PE01. The technology disclosed herein can extend to additional sequences of input data elements and input partial sums.

Figure 9A:
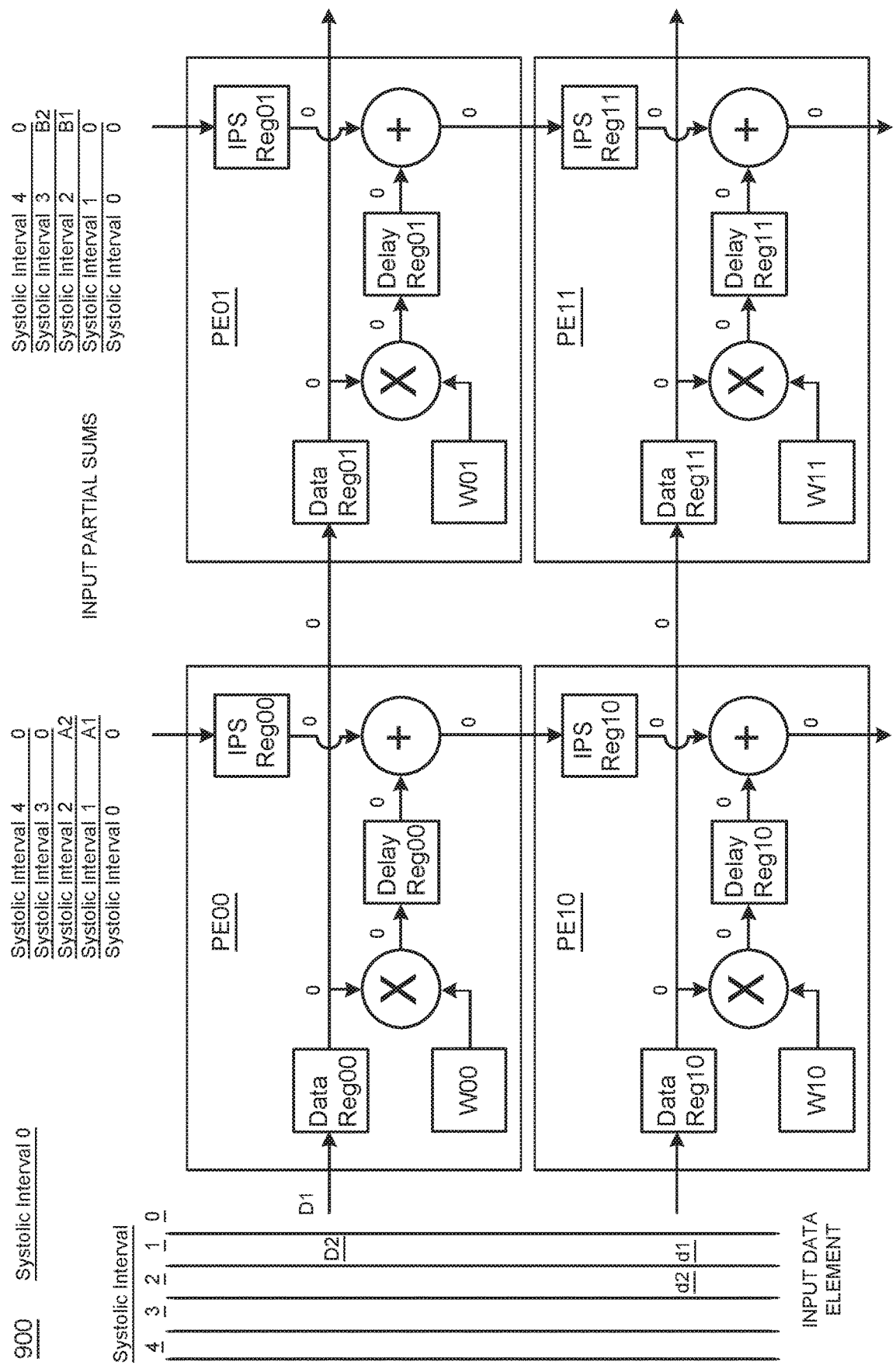
FIGS. 9A-9F shows an example systolic array processing data over sequence of systolic intervals.

FIG. 9A shows the state of the systolic array 900 at systolic interval 0. The weights W00, W01, W10, and W11 are pre-loaded. In PE00, an input data element D1 is received for writing to and storing in Data Reg00 for use during the next systolic interval. All other inputs and other states are initialized to zero.

Figure 9B:
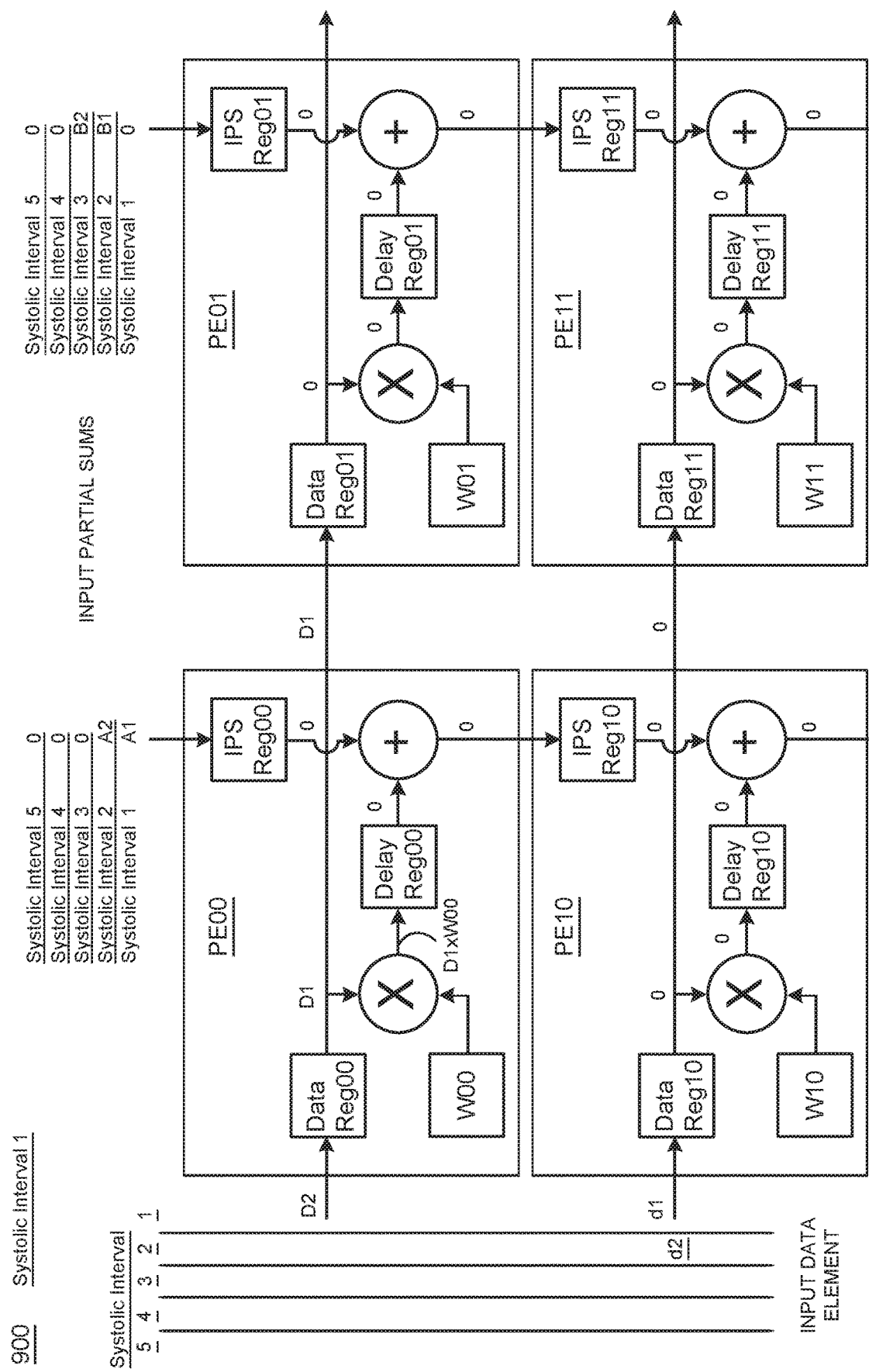

FIG. 9B shows the state of the systolic array 900 at systolic interval 1. In PE00, an input data element D2 is received for writing to and storing in Data Reg00 for using during the next systolic interval. The stored input data element D1 can be read from Data Reg00 and provided as an input to both the multiplier of PE00 and to Data Reg 01 of PE01. The multiplier in PE00 multiplies D1 by W00 to generate a multiplication result D1×W00, which is provided for writing to and storing in Delay Reg00 for use in an addition operation during the next systolic interval. The input partial sum A1 is received for writing to and storing in IPS Reg00 for use in the addition operation during the next systolic interval.

In PE01, the input data element D1 is received for writing to and storing in Data Reg01 for use during the next systolic interval.

In PE10, an input data element d1 is received for writing to and storing in Data Reg10 for use during the next systolic interval.

Figure 9C:
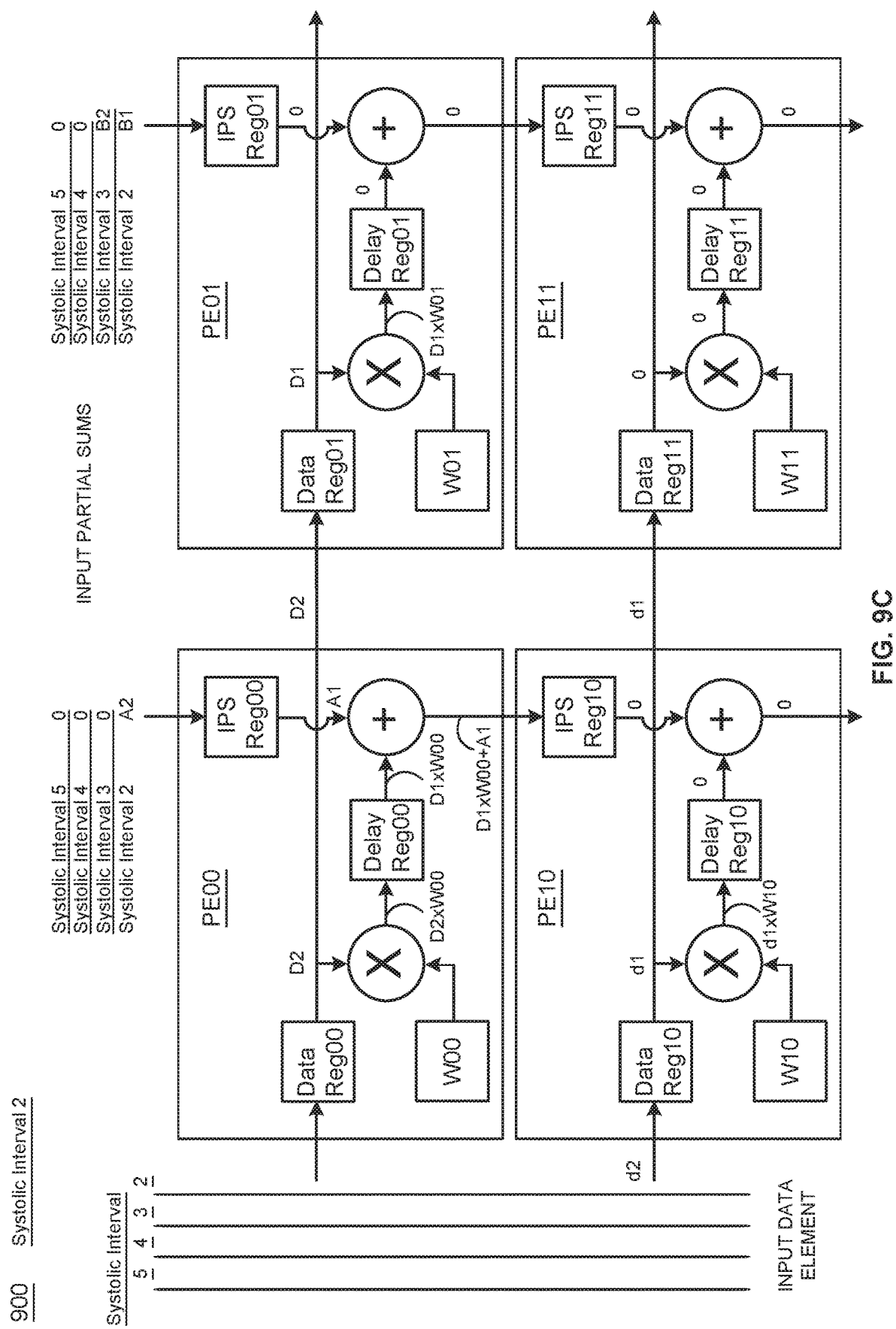

FIG. 9C shows the state of the systolic array 900 at systolic interval 2. In PE00, the input data element D2 can be read from Data Reg00 and provided as an input to both the multiplier of PE00 and the Data Reg 01 of PE01. The multiplier in PE00 multiplies D2 by W00 to generate a multiplication result D2×W00, which is provided for writing to and storing in Delay Reg00 for use in an addition operation during the next systolic interval. The multiplication result D1×W00 stored in Delay Reg00 and the input partial sum A2 stored in the IPS Reg00 are read and provided to the accumulator for addition, thereby generating the output partial sum D1×W00+A1, which is communicated to PE10 in the next row as an input partial sum. The input partial sum A2 is received for writing to and storing in IPS Reg00 for use in the addition operation during the next systolic interval.

In PE01, the input data element D2 is received for writing to and storing in Data Reg01 for using during the next systolic interval. The stored input data element D1 can be read from Data Reg01 and provided as an input to the multiplier of PE01 (and optionally to a PE in a next column). The multiplier in PE01 multiplies D1 by W01 to generate a multiplication result D1×W01, which is provided for writing to and storing in Delay Reg01 for use in an addition operation during the next systolic interval. The input partial sum B1 is received for writing to and storing in IPS Reg01 for use in the addition operation during the next systolic interval.

In PE10, the input data element d2 is received for writing to and storing in Data Reg10 for using during the next systolic interval. The stored input data element d1 can be read from Data Reg10 and provided as an input to both the multiplier of PE10 and the Data Reg11 of PE11. The multiplier in PE10 multiplies d1 by W10 to generate a multiplication result d1×W10, which is provided for writing to and storing in Delay Reg10 for use in an addition operation during the next systolic interval. The input partial sum D1×W00+A1 is received from PE00 for writing to and storing in IPS Reg10 for use in the addition operation during the next systolic interval.

In PE11, an input data element d1 is received for writing to and storing in Data Reg10 for use during the next systolic interval.

Figure 9D:
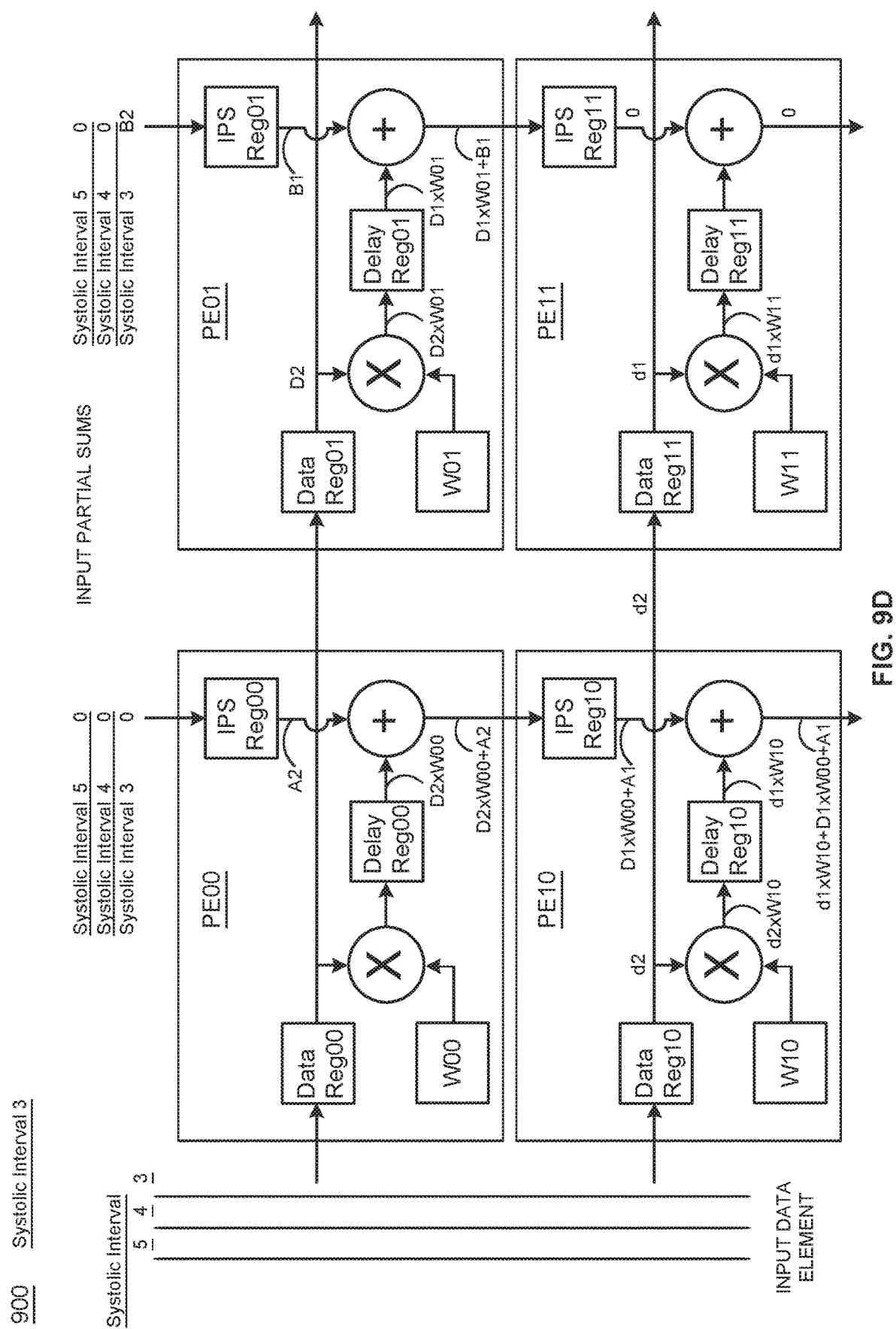

FIG. 9D shows the state of the systolic array 900 at systolic interval 3. In PE00, the multiplication result D2×W00 stored in Delay Reg00 and the input partial sum A2 stored in the IPS Reg00 are read and provided to the accumulator for addition, thereby generating the output partial sum D2×W00+A2, which is communicated to PE10 in the next row as an input partial sum.

In PE01, the stored input data element D2 can be read from Data Reg01 and provided as an input to the multiplier of PE01 (and optionally to a PE in a next column). The multiplier in PE01 multiplies D2 by W01 to generate a multiplication result D2×W01, which is provided for writing to and storing in Delay Reg01 for use in an addition operation during the next systolic interval. The multiplication result D1×W01 stored in Delay Reg01 and the input partial sum B1 stored in the IPS Reg01 are read and provided to the accumulator for addition, thereby generating the output partial sum D1×W01+B1, which is communicated to PE11 in the next row as an input partial sum. The input partial sum B2 is received for writing to and storing in IPS Reg01 for use in the addition operation during the next systolic interval.

In PE10, the stored input data element d2 can be read from Data Reg10 and provided as an input to both the multiplier of PE10 and the Data Reg11 of PE11. The multiplier in PE10 multiplies d2 by W10 to generate a multiplication result d2×W10, which is provided for writing to and storing in Delay Reg10 for use in an addition operation during the next systolic interval. The multiplication result d1×W10 stored in Delay Reg10 and the input partial sum D1×W00+A1 stored in the IPS Reg10 are read and provided to the accumulator for addition, thereby generating the output partial sum d1×W10+D1×W00+A1 (which can optionally be communicated to a PE in the next row as an input partial sum). The input partial sum D2×W00+A2 is received from PE00 for writing to and storing in IPS Reg10 for use in the addition operation during the next systolic interval.

In PE11, the input data element d2 is received for writing to and storing in Data Reg11 for using during the next systolic interval. The stored input data element d1 can be read from Data Reg11 and provided as an input to the multiplier of PE11 (and optionally to a PE in a next column). The multiplier in PE11 multiplies d1 by W11 to generate a multiplication result d1×W11, which is provided for writing to and storing in Delay Reg11 for use in an addition operation during the next systolic interval. The input partial sum D1×W00+B1 is received from PE01 for writing to and storing in IPS Reg11 for use in the addition operation during the next systolic interval.

Figure 9E:
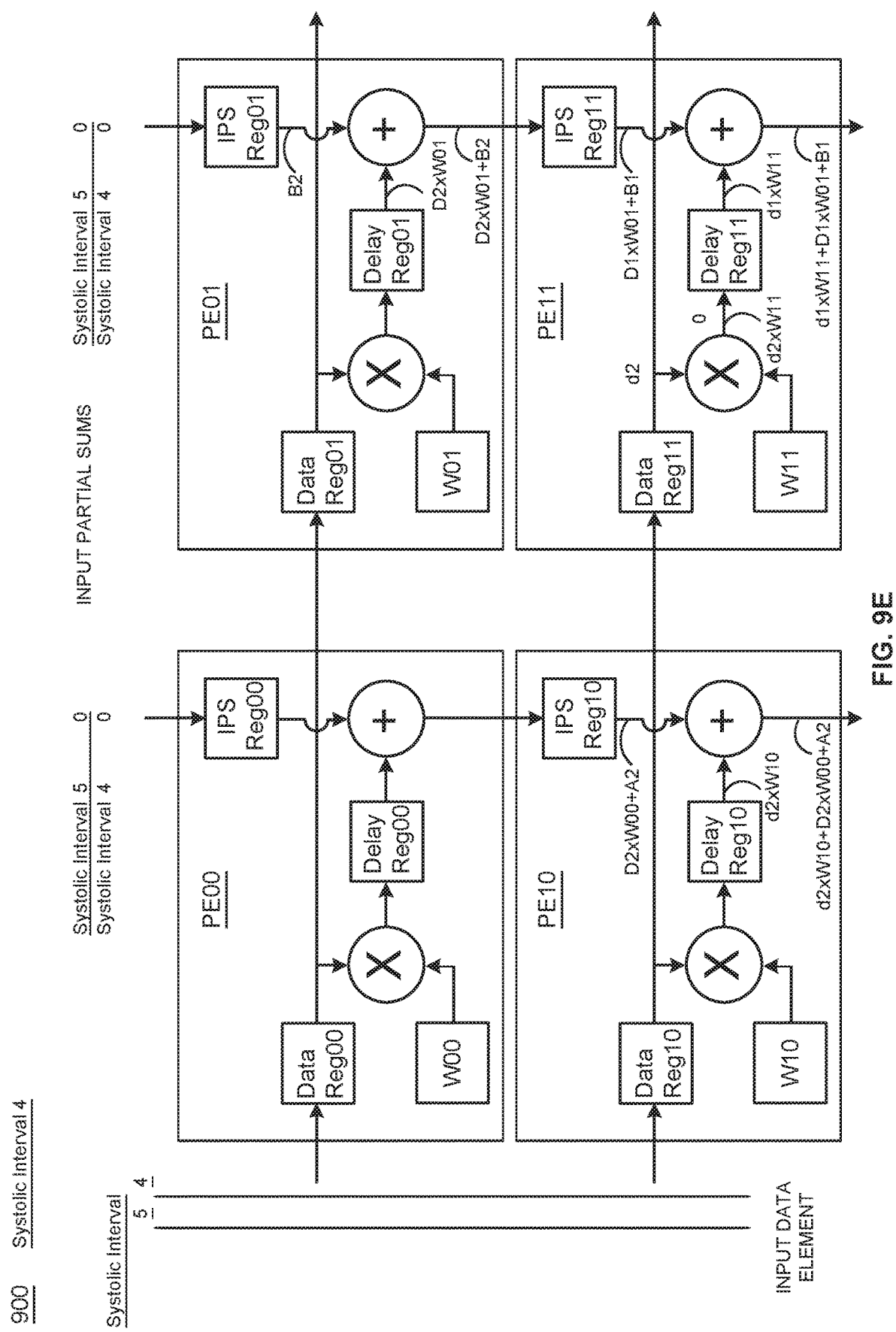

FIG. 9E shows the state of the systolic array 900 at systolic interval 4. In PE01, the multiplication result D2×W01 stored in Delay Reg01 and the input partial sum B2 stored in the IPS Reg01 are read and provided to the accumulator for addition, thereby generating the output partial sum D2×W01+B2, which is communicated to PE11 in the next row as an input partial sum.

In PE10, the multiplication result d2×W10 stored in Delay Reg10 and the input partial sum D2×W00+A2 stored in the IPS Reg10 are read and provided to the accumulator for addition, thereby generating the output partial sum d2×W10+D2×W00+A2 (which can optionally be communicated to PE10 in the next row as an input partial sum).

In PE11, the stored input data element d2 can be read from Data Reg11 and provided as an input to both the multiplier of PE11 (and optionally to a PE in a next column). The multiplier in PE11 multiplies d2 by W11 to generate a multiplication result d2×W11, which is provided for writing to and storing in Delay Reg11 for use in an addition operation during the next systolic interval. The multiplication result d1×W11 stored in Delay Reg11 and the input partial sum D1×W01+B1 stored in the IPS Reg11 are read and provided to the accumulator for addition, thereby generating the output partial sum d1×W11+D1×W01+B1 (which can optionally be communicated to a PE in the next row as an input partial sum). The input partial sum D2×W01+B2 is received from PE01 for writing to and storing in IPS Reg11 for use in the addition operation during the next systolic interval.

Figure 9F:
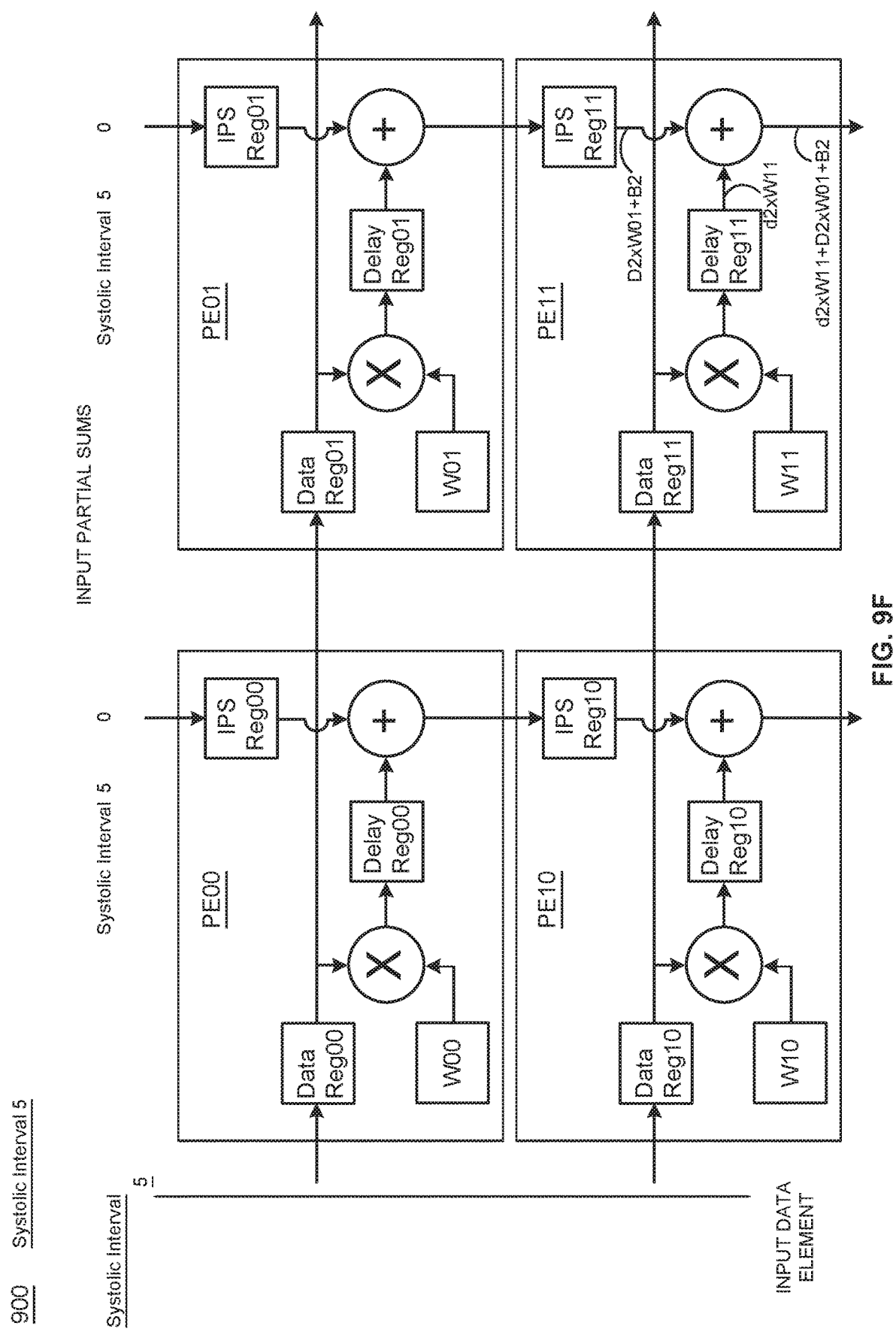

FIG. 9F shows the state of the systolic array 900 at systolic interval 5. In PE11, the multiplication result d2×W11 stored in Delay Reg11 and the input partial sum D2×W01+B2 stored in the IPS Reg11 are read and provided to the accumulator for addition, thereby generating the output partial sum d2×W11+D2×W01+B2 (which can optionally be communicated to PE10 in the next row as an input partial sum).

The example states of data flow illustrated in FIG. 9A-9F can be performed for one or more starting input data elements and for any number of starting input partial sums. The number of columns and rows can continue for any plurality of columns and any plurality of rows. The individual PE's can implement further technology such as illustrated and discussed with FIG. 2-5, including technology for energy saving. The example states of data flow illustrated in FIG. 9A-9F feature a two stage pipeline for multiply-addition with a delay register separating the pipeline. Other examples can feature additional pipeline stages for the illustrated operations and/or other types of operations performed by systolic processors.

Figure 10:
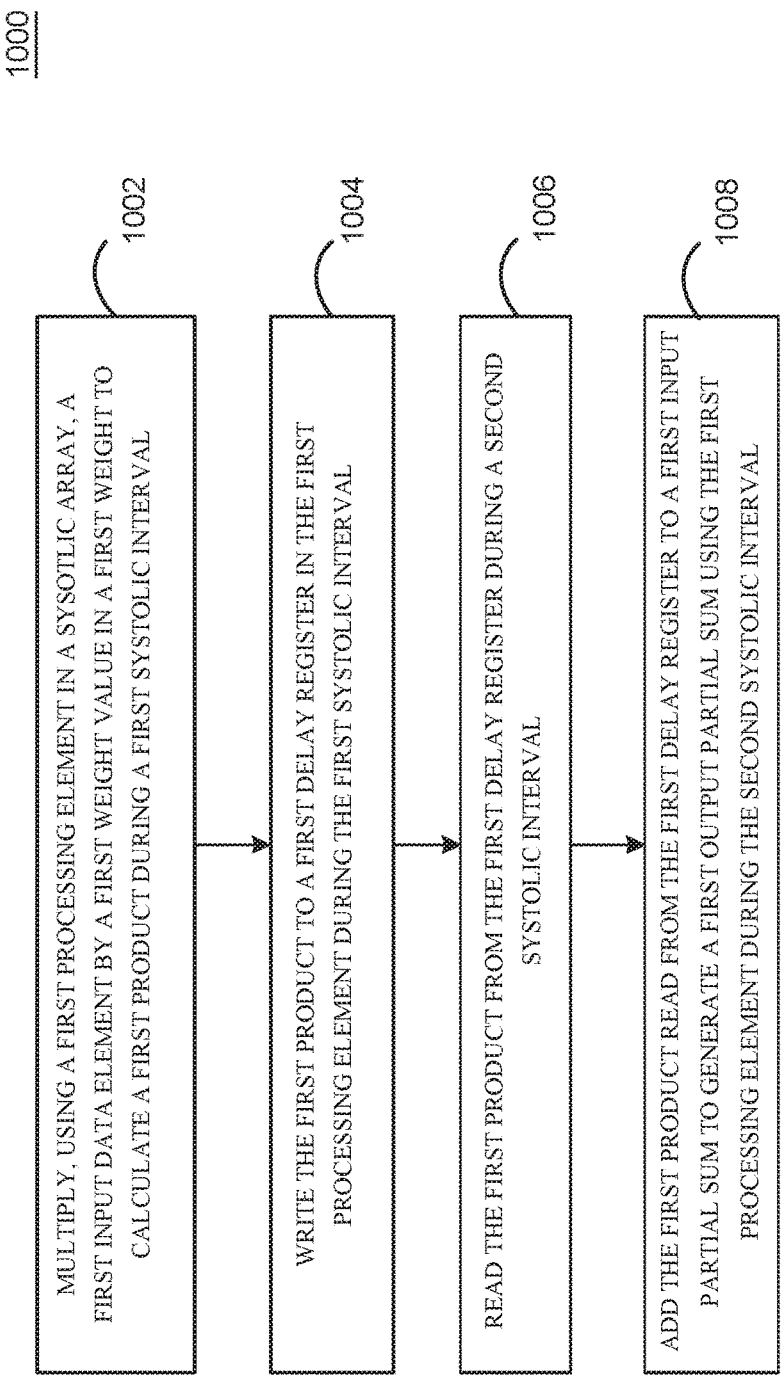
FIG. 10 shows an example flowchart of a process for performing a multiply-delayed-accumulate operation using a processing element in a systolic array.

FIG. 10 shows an example flowchart of a process for performing a multiply-delayed-accumulate operation using a processing element in a systolic array. The PE may be part of a systolic array such as illustrated in FIG. 1, FIG. 3, or FIG. 9A-9F. For purposes of description, it will be assumed that the PE has been initialized with a first weight, based on the location of the PE within the systolic array. The weight may reflect, for example, a portion of a trained neural network model.

In block 1002, a first input data element is multiplied by a first weight in a first weight register using a first processing element to calculate a first product during a first systolic interval. The first input data element may represent, for example, an element of an array corresponding to input data to the trained neural network. The first processing element may correspond, for example, to the multiplier of FIG. 9A-9F.

In block 1004, the first product is written to a first delay register in the first processing element during the first systolic interval. The first delay register is illustratively configured to maintain the first product until a subsequent systolic interval. As discussed above, writing the first product to the first delay register may beneficial reduce the size and power consumption of the PE at a given clock speed relative to a process that excludes the delay register.

In block 1006, the first product is read from the first delay register during a second (subsequent) systolic interval. The first product read from the first delay register is then, at block 1008, added to a first input partial sum to generate a first output partial sum using the first processing element during the second systolic interval. Accordingly, via blocks 1002, a multiply-accumulate operation can be completed over two systolic intervals, rather than a single interval. While FIG. 10 depicts a single multiply-accumulate operation, it is expected that multiple such operations can occur at least partly concurrently within a single PE. For example, the process of FIG. 10 may be implemented at each systolic interval, such that during the second systolic interval (e.g., of blocks 1006 and 1008), an additional input data element is multiplied against the first weight value and stored within the first delay register (e.g., as blocks 1002 and 1004 of an additional implementation of the process of FIG. 10). Thus, use of a multiply-delayed-accumulate operation (e.g., over two systolic cycles) can be expected to minimally impact overall time required to complete processing of input data using the systolic array.

An example of performing the process described in FIG. 10 is further described above with respect to FIG. 9A-9F. The process discussed with respect to FIG. 10 can include any of the interactions described with respect to FIGS. 9A-9F and other power saving features described below.

Figure 2:
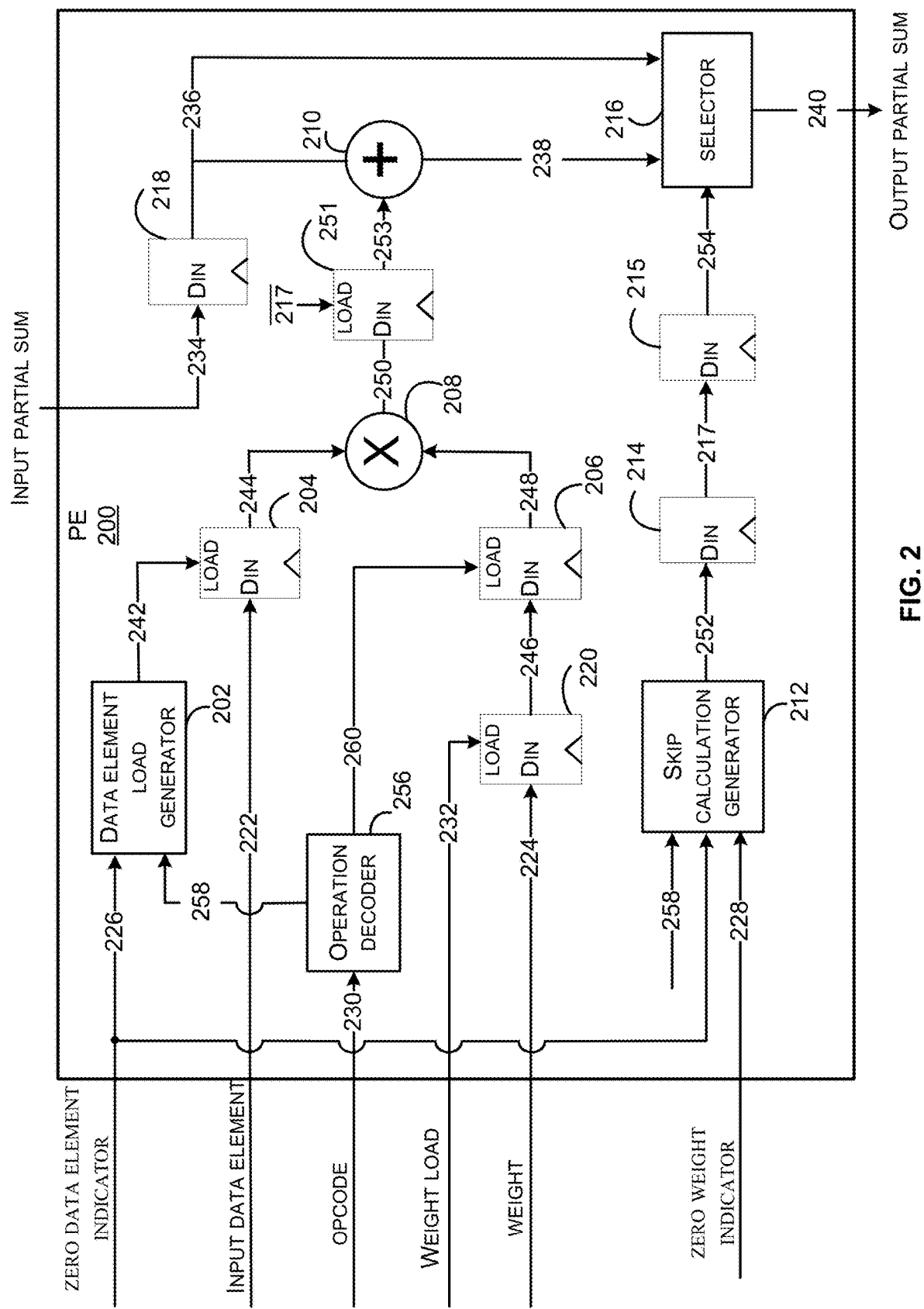
FIG. 2 illustrates a processing element for neural network computations, according to certain examples of the disclosed technologies.

FIG. 2 illustrates a PE 200 for neural network computations, according to certain examples of the disclosed technologies. The PE 200 may be part of a systolic array similar to the systolic array 100 in FIG. 1. Some examples may be described with reference to neural networks, however it will be understood that certain examples may be used in other applications, e.g., pattern recognition, image processing, audio processing, video processing, etc., without deviating from the scope of the technologies.

The PE 200 may include a data element load generator 202, a data register 204, a weight register 206, a multiplier 208, an adder 210, a skip calculation generator 212, a first skip calculation register 214, a second skip calculation register 215, a selector 216, an input partial sum register 218, a cached weight register 220, a delay register 251, and an operation decoder 256. The PE 200 may be configured to receive an input data element 222, a weight 224, a zero data element indicator 226, a zero weight indicator 228, an opcode 230, a weight load signal 232, and an input partial sum 234 to perform the convolution computations according to some examples. The multiplier 208 can generate a multiplication result (a product) 250 for storing in the delay register 251. The adder 210 can generate an addition result 238 (a sum) based on a stored multiplication result 253 from the delay register 251.

The PE 200 may be configured to receive the input data element 222 via a first port. The input data element 222 may correspond to an input data set, or any array of input data elements. The PE 200 may receive one input data element at a time, in uniform time periods such as systolic intervals, from the input dataset. For example, a systolic interval may correspond to a clock cycle. The input data set may be similar to an input feature map comprising input feature map elements. As an example, the input data set may correspond to an input image, an audio clip, a video clip, a text portion, or any other data which may be provided for data processing to identify a certain pattern or an object. In some instances, the input data set may correspond to an intermediate output dataset, which has gone through an activation function, e.g., ReLu or Sigmoid, as discussed with reference to FIG. 1. Each input data element 222 may include 8-bits, 16-bits, or any suitable number of bits.

The PE 200 may be configured to receive the weight 224 via a second port. In some implementations, the weight 224 may belong to a set of weight values corresponding to a convolution filter. The weight 224 may be pre-loaded in the PE 200 prior to receiving the input data element 222. In some examples, the PE 200 may receive one weight value at a time, in the systolic intervals, from the set of weight values, to pre-load each PE in a given row with a respective weight value. The PE may pass the weight value to the next PE in the respective row until each PE in the given row has been pre-loaded. Each PE may cache the respective weight value to use for computations with the input data elements. The weight values in the convolution filter may have been pre-determined based on supervised learning, unsupervised learning, or any other method suitable for determining convolutional filters. For example, given an input image, the weight values in the convolution filter can represent a spatial distribution of pixels for certain features to be detected from the input image. The weight 224 may include 8-bits, 16-bits, or any suitable number of bits.

The PE 200 may be configured to receive the zero data element indicator 226 for a current multiply-delayed-accumulate operation via a third port. The zero data element indicator 226 may include a single bit or multiple bits. The zero data element indicator 226 may be used to indicate whether the input data element 222 associated with the zero data element indicator 226 is zero. For example, a value of "1" for the zero data element indicator 226 may indicate that the input data element 222 associated with the zero data element indicator 226 is zero, and a value of "0" for the zero data element indicator 226 may indicate that the input data element 222 associated with the zero data element indicator 226 is not zero. A "0" may correspond to a logical zero or a logical low, and a "1" may correspond to a logical one or a logical high. For example, in some implementations, the logical zero may be represented by a first range of voltage levels (e.g., 0-2 volts), and the logical one may be represented by a second range of voltage levels (e.g., 3-5 volts). It will be understood that other implementations to represent a "0" value and a '1' value are possible without deviating from the scope of the disclosed technologies. The zero data element indicator 226 may be generated by a circuit external to the PE 200, and passed to all the PEs in the same row sequentially, in the systolic intervals.

The PE 200 may be configured to receive the zero weight indicator 228 via a fourth port. The zero weight indicator 228 may include a single bit or multiple bits. The zero weight indicator 228 may be used to indicate whether the weight 224 associated with the zero weight indicator 228 is zero. For example, a value of "1" for the zero weight indicator 228 may indicate that the weight 224 is zero, and a value of "0" for the zero weight indicator 228 may indicate that the weight 224 is not zero. The zero weight indicator 228 may be generated by a circuit external to the PE 200, and passed to all the PEs in the same row sequentially along with the weight 224.

The weight load signal 232 may be used to load the weight 224 into the cached weight register 220 to provide a cached weight 246. The weight load signal 232 may be asserted to cache the weight 224 for the PE 200 in the cached weight register 220 before the input data element 222 is fed into the array. As the weights are shifted into the array to pre-load each PE with a respective weight value, the weight load signal 232 may be asserted for each PE at certain systolic intervals in order to pre-load each PE with the appropriate weight value.

The operation decoder 256 may be configured to decode the opcode 230 to determine an operation to be executed by the PE 200 for different instructions represented by different opcode values. In some examples, a first opcode value may correspond to an instruction to shift the weights from one PE to another in the systolic array. A second opcode value may correspond to an instruction to start the arithmetic computations by the PE. For example, once the weights have been pre-loaded in the systolic arrays, the input data elements may be read from the memory and the arithmetic computations may be performed as the input data elements pass through the array. A third opcode value may correspond to an instruction to execute NOPs. The NOPS may be used to space two systolic array instructions, or when there are no input data elements to be read from the memory. For example, the NOPs may be used to space the instructions to shift the weights, and the instructions to start the arithmetic computations. For example, for a 4×4 array, it may take up to 15 cycles to shift the weights into all the PEs in the array before starting the arithmetic computations so 15 NOP cycles may be needed. The operation decoder 256 may be configured to decode the opcode 230 to generate a NOP 258, and a start computations signal 260. The opcode 230 may include any suitable number of bits, e.g., two, four, etc.

In some implementations, the input data element 222, the weight 224, the opcode 230, the zero data element indicator 226, and the zero weight indicator 228 may belong to the row input bus 102, as discussed with reference to FIG. 1. The row input bus 102 may also include one or more control signals, e.g., a data type. In some implementations, a splitter (not shown) may be used in the PE 200 to split the row input bus 102 into different internal buses to carry the input data element 222, the weight 224, the opcode 230, the zero data element indicator 226, and the zero weight indicator 228 within the PE 200.

The data element load generator 202 may be configured to generate a data load signal 242 that may be used to allow the data register 204 to skip storing of the input data element 222 in certain conditions. In some examples, the input data element 222 may be loaded into the data register 204 when the data load signal 242 is asserted based on the zero data element indicator 226 and the NOP 258. The data load signal 242 may be asserted when the zero data element indicator 226 corresponding to the input data element 222 is "0" and the opcode 230 does not indicate a NOP (e.g., the NOP 258 is "0"). The data load signal 242 may not be asserted when the zero data element indicator 226 corresponding to the input data element 222 or the NOP 258 is "1." The data element load generator 202 may be implemented using an OR, NOR, NAND, or any suitable circuit.

The data register 204 may be configured to store the input data element 222, or skip storing of the input data element 222 to provide a stored input data element 244 based on the data load signal 242 for a current multiply-delayed-accumulate operation. In some implementations, the data register 204 may store a Din input if a load input is "1", and may hold the previous value if the load input is "0." For example, if the data load signal 242 is "1", the data register 204 may store a new value for the input data element 222, and if the data load signal 242 is "0", the data register 204 may skip storing the new value for the input data element 222. Thus, in some instances, the data register 204 may only store non-zero value of the input data element 222. According to certain examples, skipping the storing of the new value by the data register 204 may result in not toggling the stored input data element 244 and holding the previous value of the stored input data element 244.

The weight register 206 may be configured to store the cached weight 246 to provide a stored weight value 248 based on the start computations signal 260. In some implementations, the weight register 206 may store a Din input if a load input is "1", and may hold the previous value if the load input is "0." For example, if the start computations signal 260 is asserted (e.g., the start computations signal 260 is "1"), the cached weight 246 may be loaded into the weight register 206, else the weight register 206 may hold the previous value. Thus, the weight 224 previously loaded into the cache register 220 using the weight load signal 232 may be shifted into the weight register 206 at the start of the arithmetic computations. In some examples, the stored weight value 248, once loaded at the start of the arithmetic computations, remains unchanged as the input data element is fed into the PE 200, one element at a time, for computations corresponding to one or more waves through the systolic array.

The multiplier 208 may be configured to perform a multiplication operation between the stored input data element 244 and the stored weight value 248 to provide a multiplication result 250 during a first time period or first systolic interval. The multiplier 208 may be implemented using a multiplier circuit. The multiplication result can be stored in a delay register 251.

Generally, when there is a change in the value of any of the inputs of the multiplier 208 (e.g., a "1" to "0", or vice-versa), the multiplier 208 performs the multiplication operation, and the output of the multiplier 208 changes resulting in dynamic power dissipation. For a systolic array comprising hundreds or thousands of PEs similar to the PE 200, the power consumption can be substantial. According to certain examples, power consumption of the PE 200 can be reduced by avoiding the toggling of all the inputs to the multiplier 208 under certain conditions so that the multiplication operation can be skipped altogether during the first systolic interval. In some implementations, when the zero data element indicator 226 or the NOP 258 is asserted, storing of the input data element 222 in the data register 204 can be skipped using the data load signal 242, thus keeping the stored input data element 244 input going into the multiplier 208 unchanged. For example, the zero data element indicator 226 or the NOP 258 may generate a value of "0" for the data load signal 242, which can disable loading of the input data element 222 into the data register 204. Since the weight 224 has been pre-loaded into the PE 200, input to the weight register 206 may not change even if the cached weight 246 is zero. Therefore, the stored weight value 248 may not change as the input data element 222 is received by the PE 200 for the current multiply-delayed-accumulate operation. In this case, the stored input data element 244 and the stored weight value 248 may hold their values from the previous multiply-delayed-accumulate operation and may not toggle. Thus, the multiplication result 250 may not change and the dynamic power consumption can be reduced during the first systolic interval. Since the multiplication result 250 may not be accurate for the current multiply-delayed-accumulate operation, the multiplication result 250 is not propagated to other PEs in the array.

A delay register 251 can temporarily store the multiplication result 250 generated by the multiplier 208 during a first systolic interval of a multiply-delayed-accumulate operation for delayed use by the adder 210 during a subsequent systolic interval of the multiply-delayed-accumulate operation. For example, during a first systolic interval, the delay register 251 can store a first multiplication result 250 generated by the multiplier 208. During a second systolic interval that follows the first systolic interval, the delay register 251 can provide the stored first multiplication result 253 to the adder 210 and store a second multiplication result 250 generated by the multiplier 208. During a third systolic interval that follows the second systolic interval, the delay register 251 can provide the stored second multiplication result 253 to the adder 210 and store a third multiplication result 250 generated by the multiplier 208.

The delay register 251 can be enabled during operational, non-zero conditions. If a zero is provided as an input data element or as a weight preceding a first systolic interval, then the delay register 251 can skip writing the multiplication result 250 received from the output of the multiplier 208 during the first systolic interval. An inverted skip calculation indicator 217 can be used to activate the delay register 251 during non-skip conditions. The inverted skip calculation indicator 217 can disable or skip writing to the delay register during skip conditions.

The PE 200 may be configured to receive the input partial sum 234 via a fifth port during a first systolic interval. The input partial sum 234 may be a partial sum generated from a neighboring PE in a row above and in the same column of the systolic array. In some instances, the input partial sum 234 may include inputs from external circuitries. For example, when the PE 200 is a PE in a first row of the systolic array, the input partial sum 234 may include default values for the input partial sum. As discussed with reference to FIG. 1, the input partial sum 234 may be part of the column input bus 104. In some instances, the column input bus 104 may also be used to load weights in the PE 200. The column input bus 104 may also include control signals, e.g., an overflow bit. In some implementations, the opcode 230 may be provided to the PE 200 via the column input bus 104. The input partial sum 234 may be stored in an input partial sum register 218 to provide a stored input partial sum 236 during a second systolic interval.

The adder 210 may be configured to perform an addition operation on the stored multiplication result 250 stored in delay register 251 and the stored input partial sum 236 to provide an addition result 238 during a second systolic interval that occurs after the first systolic interval during which the multiplication was performed. The adder 210 may be implemented using an adder circuit.

The skip calculation generator 212 may be configured to generate a skip calculation indicator 252 which may be used to bypass the multiplication result 250 under certain skip conditions. For example, when a zero is detected on the input data element 222, when the weight 224 is a zero, or the opcode 230 indicates a NOP, the multiplication result 250 generated during a first systolic interval may be inaccurate and may need to be bypassed based on the NOP 258, the zero data element indicator 226 and/or the zero weight indicator 228. In some examples, the skip calculation generator 212 may assert the skip calculation indicator 252 to "1", when the NOP 258, the zero data element indicator 226, or the zero weight indicator 228 is "1." The skip calculation generator 212 may use OR, NOR, NAND or other suitable circuits to generate the skip calculation indicator 252. The skip calculation indicator 252 may be stored in a first skip calculation register 214 to provide a first skip calculation indicator 217 that can be inverted and used by the delay register 251 to skip storing a multiplication result 250 generated during a first systolic interval. The first skip calculation indicator 217 may be stored in a second skip calculation register 254 to provide a second skip calculation indicator 254 that may be used by the selector 216 during a second systolic interval.

The selector 216 may be configured to select either the addition result 238 generated during a second systolic interval or the stored input partial sum 236 based on the second stored skip calculation indicator 254 to provide an output partial sum 240 via a sixth port. In some examples, when a value of either the input data element 222 or the weight 224 for a current multiply-delayed-accumulate operation is zero, or when the NOP 258 is asserted, the addition result 238 during a following systolic interval may not provide a correct result for the current multiply-delayed-accumulate operation since the delay register 251 may hold a stale value from a stale multiplication result 250 from the previous multiply-delayed-accumulate operation. In such cases, the stored skip calculation indicator 254 may bypassing the addition result 238 and select the stored input partial sum 236 to provide the output partial sum 240 during the second systolic interval. For example, when the stored skip calculation indicator 254 is "1", the stored input partial sum 236 may be selected as the output partial sum 240, and when the stored skip calculation indicator 254 is "0", the addition result 238 may be selected as the output partial sum 240. The selector 216 may be implemented using a multiplexer, or any suitable circuit.

According to certain examples, when the input data element 222, or the weight 224 is zero, selecting the input partial sum 236 as the output partial sum 240 based on the stored skip calculation indicator 254 can provide the same functionality as adding a zero multiplication result 250 to the stored input partial sum 236 by the adder 210. Thus, bypassing the output of the adder 210 during a subsequent systolic interval may not result in any change in the functionality of the PE 200 to perform convolution computations. Generation of the zero data element indicator 226 and the zero weight indicator 228 for each row of an array is discussed with reference to FIG. 3.

Figure 3:
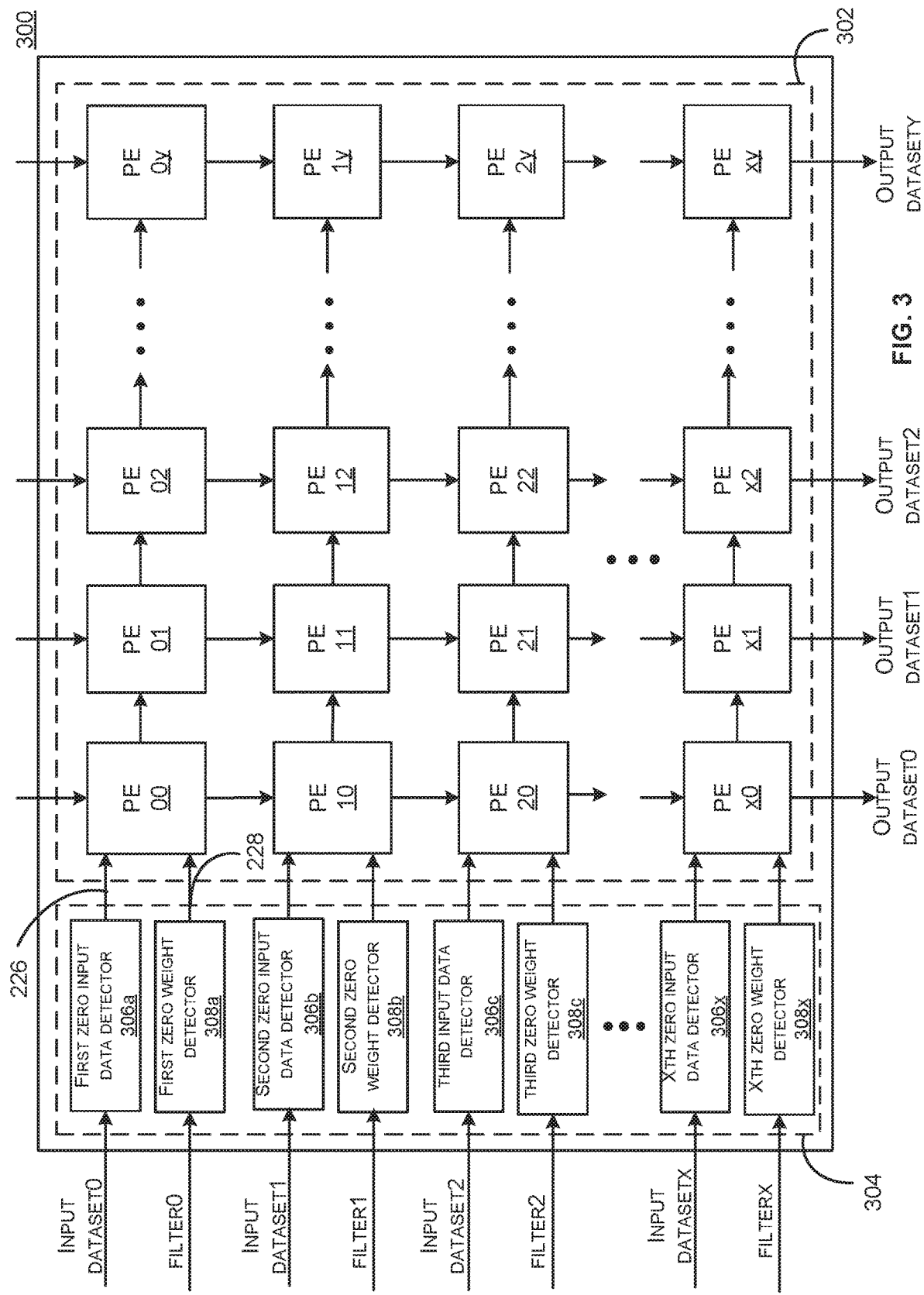
FIG. 3 illustrates an apparatus including zero detector circuits for input data elements and weights entering a systolic array for neural network computations, according to certain examples of the disclosed technologies.

FIG. 3 illustrates an apparatus 300 including zero detector circuits for input data elements and weights entering a systolic array for neural network computations, according to certain examples of the disclosed technologies.

The apparatus 300 may include a two-dimensional systolic array 302 comprising PEs arranged into rows and columns. The systolic array 302 may be similar to the systolic array 100 in FIG. 1. A first row of the systolic array 302 may include PE 00, PE 01, PE 02, ..., PE 0y, a second row of the systolic array 302 may include PE 10, PE 11, PE 12, ..., PE 1y, a third row of the systolic array 302 may include PE 20, PE 21, PE 22, ..., PE 2y, and an Xth row of the systolic array 302 may include PE x0, PE x1, PE x2, ..., PE xy. The x and y may include positive integers, e.g., 32, 64, 128, or any suitable number. Each PE of the systolic array 302 may be similar to the PE 200, and include means to perform arithmetic computations using power efficient methods, as discussed with reference to FIG. 2.

Figure 4:
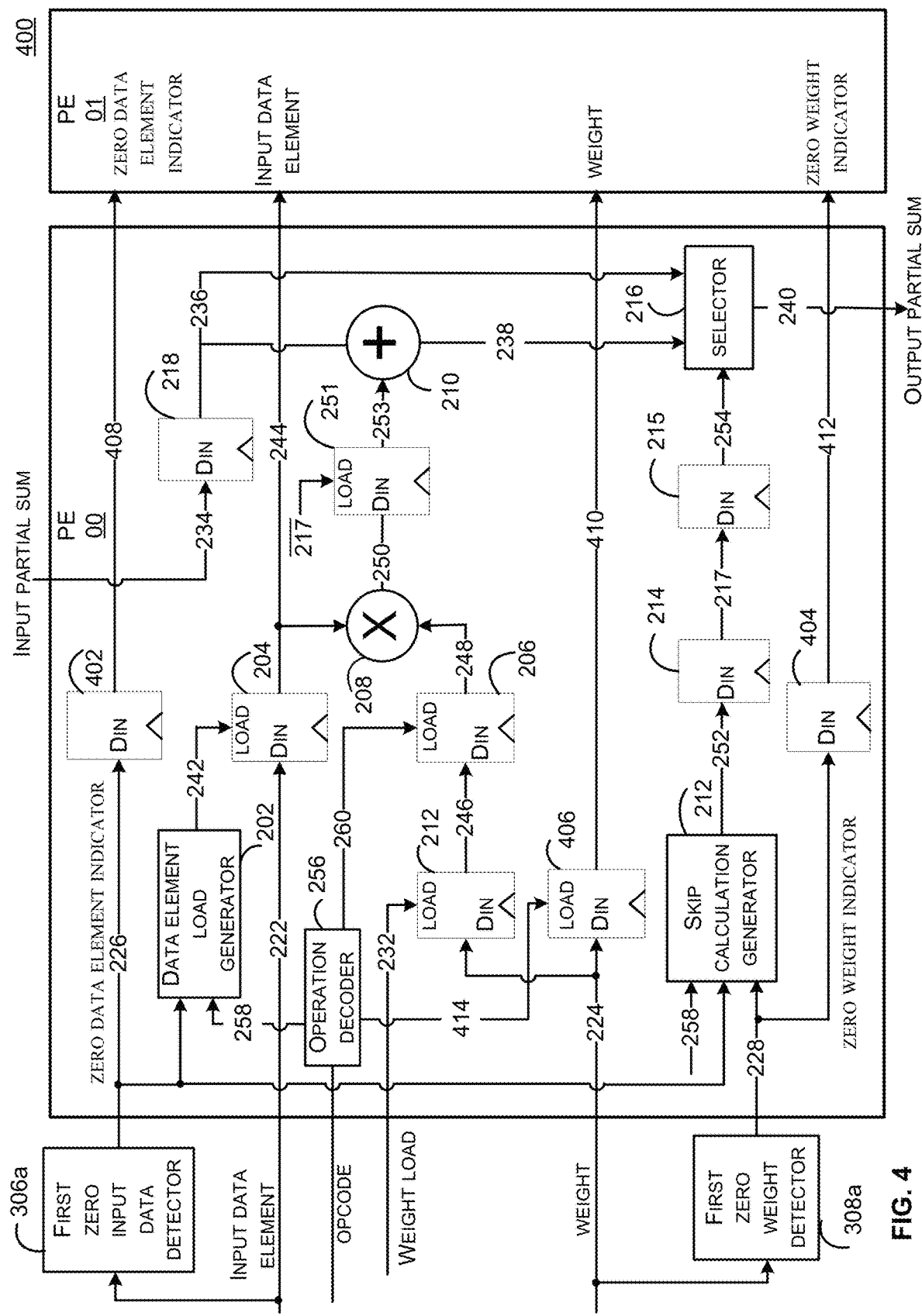
FIG. 4 illustrates an apparatus showing propagation of zero detectors, the input data element and the weight value from one processing element to another, according to a first example of the disclosed technologies.

In certain examples, a first (e.g., leftmost) PE in each row of the systolic array 302 may be coupled to a respective zero input data detector circuit to detect a zero value on an input data element, and a respective zero weight detector circuit to detect a zero value on a weight value entering the systolic array 302. For example, the PE 00 in the first row may be coupled to a first zero input data detector 306a and a first zero weight detector 308a (e.g., as shown in FIG. 4), the PE 10 in the second row may be coupled to a second zero input data detector 306b and a second zero weight detector 308b, the PE 20 in the third row may be coupled to a third zero input data detector 306c and a third zero weight detector 308c, and the PE x0 in the Xth row may be coupled to an Xth zero input data detector 306x and an Xth zero weight detector 308x. The first zero input data detector 306a, the second zero input data detector 306b, the third zero input data detector 306c, . . . , and the Xth zero input data detector 306x may be configured to detect a zero value on a respective input data element in an input dataset0, an input dataset1, an input dataset2, . . . , and an input datasetx respectively. Similarly, the first zero weight detector 308a, the second zero weight detector 308b, the third zero weight detector 308c, . . . , and the Xth zero weight detector 308x may be configured to detect a zero value on a respective weight value in a filter0, a filter1, a filter2, . . . , and a filterx respectively.

Each of the input dataset0, the input dataset1, the input dataset2, . . . , and the input datasetx may belong to an image, a text, a video clip, an audio clip, or another type of data set which may need to be processed by a neural network processor for convolution computations. In some instances, the input dataset0, the input dataset1, the input dataset2, . . . , and the input datasetx may be associated with output dataset0, output dataset1, output dataset2, . . . , output datasety generated by an intermediate layer of the convolution operation. For example, the output dataset0, output dataset1, output dataset2, . . . , output datasety may go through activation functions and fed back to the systolic array 302 as the input dataset0, the input dataset1, the input dataset2, . . . , and the input datasetx. The filter0, the filter1, the filter2, . . . , and the filterx may include different sets of weight values to convolve with the input dataset0, the input dataset1, the input dataset2, . . . , and the input datasetx. The weight values in the filter0, the filter1, the filter2, . . . , and the filterx may be pre-determined using supervised learning, non-supervised learning, or any suitable method of determining convolution filters.

Each zero input data detector for the respective row may be configured to detect whether an input data element from the input dataset entering the respective row is "0" and generate a corresponding zero input data indicator for that input data element. The corresponding zero data element indicator may be passed into the first PE of the respective row along with the input data element. For example, the PE 00 may be the first PE of the first row in the systolic array 302. The PE 00 may be configured to receive input data elements from the input dataset0 prior to other PEs in the first row (e.g., PE 01, PE 02, . . . , PE 0y). In some examples, one input data element at a time may be fed sequentially, in systolic intervals, from the input dataset0 to the PE 00. The first zero input data detector 306a may be configured to generate the corresponding zero data element indicator 226 in each of the systolic intervals (e.g. clock cycles) for each input data element from the input dataset0. The zero data element indicator 226 corresponding to each input data element may be fed to the PE 00 sequentially, in systolic intervals, along with each input data element. The PE 00 may store or skip storing the received input data element 222 based on the value of the respective data load signal 242. In some implementations, the first zero input data detector 306a may include a comparator to compare the incoming input data element with a zero to assert (e.g., set to "1") or de-assert (e.g., set to "0") the zero data element indicator 226 based on the value of the incoming input data element. For example, the comparator may be implemented using an OR, XOR, NAND, or any suitable circuit.

Each zero weight detector for the respective row may be configured to detect whether a weight value from a set of weight values entering the respective row is zero and generate a corresponding zero weight indicator for that weight value. For example, the first zero weight detector 308a may be configured to detect whether a weight value from the filter0 (e.g., the weight 224) includes a zero value and generate the corresponding zero weight indicator 228 for the weight. In some implementations, the first zero weight detector 308a may include a comparator to compare the weight value with a zero to assert (e.g., set to "1") or de-assert (e.g., set to "0") the zero weight indicator 228. For example, the comparator may be implemented using an OR, XOR, NAND, or any suitable circuit. In some examples, one weight value at a time may be fed sequentially, in systolic intervals, from the filter0 to the PE 00 for preloading the respective weight values in the PE 00 to the PE 0y prior to starting the arithmetic computations. The first zero weight detector 308a may generate a corresponding zero weight indicator for each of those weight values which may be fed to the PE 00 sequentially, in systolic intervals, along with the corresponding weight value. The PE 00 may pass the respective weight values and the corresponding zero weight indicators sequentially to the next neighboring PE until all the PEs in the first row have been preloaded with the respective weight values and the corresponding zero weight indicators. The respective weight value and the corresponding zero weight indicator may be cached in each PE before the respective input data elements are fed to each row in the systolic array 302.

The second zero input data detector 306b, the third zero input data detector 306c, . . . , and the Xth zero input data detector 306x may be similar to the first zero input data detector 306a, and may generate a respective zero data element indicator, similar to the zero data element indicator 226, to provide to the PE 10, PE 20, . . . , and PE x0, sequentially, in the systolic intervals, for power optimization. The respective zero data element indicator generated for each row may be received by a respective first PE in each row via the respective row input bus 102, and propagated, sequentially, in the systolic intervals, by the first PE to all the PEs in the given row. The second zero weight detector 308b, the third zero weight detector 308c, . . . , and the Xth zero weight detector 308x may be similar to the first zero weight detector 308a, and may generate a respective zero weight indicator, similar to the zero weight indicator 228, to provide to the PE 10, PE 20, . . . , and PE x0, sequentially, to pre-load each PE in the respective row along with the respective weight value prior to starting the arithmetic computations.

In some examples, the zero input data detectors 306a-306x, and the zero weight detectors 308a-308x may be implemented as a separate entity external to the systolic array 302. For example, the zero input data detectors 306a-306x, and the zero weight detectors 308a-308x may be part of a circuit 304. In other examples, the circuit 304 and the systolic array 302 may be part of a computing engine, which may be configured to perform arithmetic computations for the convolution operations. Some examples of the disclosed technologies can provide reduced gate count and dynamic power consumption by detecting zeros on the input data elements and the weights entering a respective first PE in each row of the systolic array, and passing the zero indicators to all the PEs in the array as compared to using respective zero detectors within each PE in the systolic array 302.

Note that FIG. 3 only shows the respective zero data element indicator and the zero weight indicator entering the first PE in each row of the systolic array 302 for ease of illustration, however it will be understood that each PE in the respective row of the systolic array 302 may also receive the respective input data element and the respective weight value along with some control signals (e.g., opcode 230, weight load 232, data type, etc.), which may be propagated from the left to the right of the systolic array 302 for each row. This is further explained with reference to FIG. 4.

FIG. 4 illustrates an apparatus 400 showing propagation of zero indicators, the input data element and the weight value from one PE to another, according to a first example of the disclosed technologies.

In some examples, each PE of the systolic array 302 may include components, in addition to the components of the PE 200 as shown in FIG. 2, to cache the weight, and the zero indicators before passing them to a neighboring PE in a given row. For example, each PE may include a zero data element indicator register 402, a zero weight indicator register 404, and an output weight register 406, in addition to the components of the PE 200. This is further explained in FIG. 4 using the PE 00 and the PE 01 as an example. The PE 00 and the PE 01 are part of the systolic array 302 as discussed with reference to FIG. 3.

The zero data element indicator register 402 may be configured to store the zero data element indicator 226 received by the PE 00 to provide a stored zero data element indicator 408. The zero data element indicator 226 may correspond to the input data element 222 received by the PE 00. As discussed with reference to FIG. 3, one input data element at a time may be fed sequentially, in systolic intervals, from the input dataset0 to the PE 00. The data register 204 may store or skip storing the input data element 222 for a current multiply-delayed-accumulate operation based on the data load signal 242. For example, if the zero data element indicator 226 is "1" or the NOP 258 is received by the PE 00 for the current multiply-delayed-accumulate operation, the data register 204 may hold the value from the previous multiply-delayed-accumulate operation or a default value. The stored input data element 244 may be provided to the PE 01 as the input data element 222.

Thus, in certain examples, if a zero is detected on the input data element 222 received by the PE 00 for the current multiply-delayed-accumulate operation, the zero value of the input data element 222 may not be propagated to the PE 01-PE 0y since the stored input data element 244 may hold the value from the previous multiply-delayed-accumulate operation or the default value. However, the stored zero data element indicator 408 corresponding to the zero value of the input data element 222 may be propagated to the neighboring PEs. The PE 01 may receive the stored zero data element indicator 408 as the zero data element indicator 226, store it, and propagate its stored zero data element indicator 408 to the neighboring PE (e.g., PE 02). The PE 01 may also propagate its stored input data element 244 from the previous multiply-delayed-accumulate operation to PE 02 along with the stored zero data element indicator 408. Thus, the zero data element indicator 226 may only be generated once by the first zero input data detector 306*a*, and passed sequentially, in systolic intervals, from the PE 00 to the PE 0*y*. The respective stored zero data element indicator 408 in each PE may be used to bypass the respective multiplier result 250 in each PE if the corresponding input data element 222 includes a zero value. Thus, the respective output partial sum 240 in each PE may be the respective input partial sum 234 during a second systolic interval of a multiply-delayed-accumulate operation if the respective input data element 222 or the respective weight 224 includes a zero value or a NOP is received during a first systolic interval for that multiply-delayed-accumulate operation.

The zero weight indicator register 404 may be configured to store the zero weight indicator 228 received by the PE 00 to provide a stored zero weight indicator 412. The zero weight indicator 228 may correspond to the weight 224 received by the PE 00. The PE 00 may be configured to receive the weight 224 for pre-loading the weights in the systolic array 302 prior to starting the arithmetic computations. For example, in some examples, one weight value at a time may be fed sequentially, in systolic intervals, from the filter0 to the PE 00. The PE 00 may store the received weight value in the output weight register 406 to provide a stored weight value 410 based on a shift weight signal 414. The stored weight value 410 may be shifted into the PE 01 as the weight 224. The shift weight signal 414 may be generated by the operation decoder 256 based on the opcode 230. For example, the opcode 230 may include a certain opcode value to indicate shifting of the weight value from one PE to another PE. The PE 01 may receive the stored zero weight indicator 412 as the zero weight indicator 228 in the next time period, store it, and propagate its stored zero weight indicator 412 to the neighboring PE (e.g., PE 02). Thus, the zero weight indicator 228 may only be generated once by the first zero weight detector 308*a*, and passed sequentially, in systolic intervals, from the PE 00 to the PE 0*y* along with the corresponding weight value.

In certain examples, the same weight value may be used by all the PEs in a given row for convolving with each input data element for an input data set to optimize the memory bandwidth. In some examples, instead of pre-loading the weights in the systolic array, respective weights may be fed into each row along with the input data elements to perform arithmetic computations. This is further explained with reference to FIG. 5.

Figure 5:
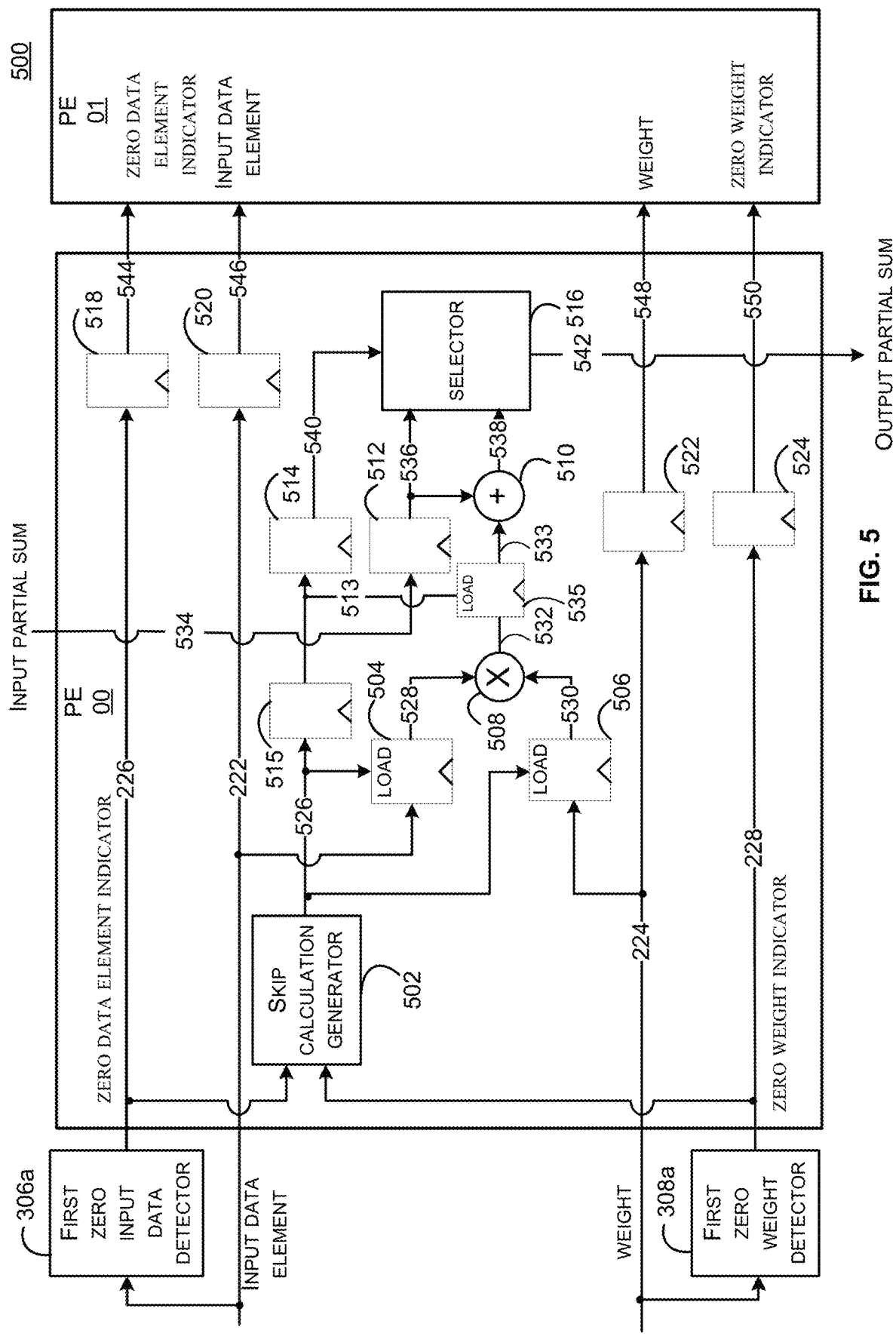
FIG. 5 illustrates an apparatus showing propagation of zero detectors, the input data element and the weight value from one processing element to another, according to a second example of the disclosed technologies.

FIG. 5 illustrates an apparatus 500 showing propagation of zero detectors, the input data element and the weight value from one PE to another, according to a second example of the disclosed technologies.

In the second example, instead of pre-loading the weights in the systolic array, one weight value at a time may be fed sequentially, in systolic intervals, from the filter0 to the PE 00, along with the input data element 222. The input data element 222 and the weight 224 may be cached in their respective registers only if no zero is detected on both the input data element 222 and the weight 224. Thus, the multiplier inputs may not toggle if a zero is detected on either the input data element 222 or the weight 224 resulting in reduced power consumption. The input data element 222 and the weight 224 may be propagated to the neighboring PEs along with the corresponding zero data element indicator 226 and the zero weight indicator 228.

In the second example, a skip calculation generator 502 may be configured to generate a skip calculation indicator 526 using the zero data element indicator 226 and the zero weight indicator 228. The skip calculation indicator 526 may be used by a data register 504 and a weight register 506 to skip storing of a zero value on the input data element 222 or the weight 224 respectively during a first systolic interval in a current multiply-delayed-accumulate operation. In some examples, the skip calculation generator 502 may perform an OR, or an NOR operation on the zero data element indicator 226 and the zero weight indicator 228 to generate the skip calculation indicator 526. The skip calculation indicator 526 may be stored in a first skip calculation register 515, which can provide a delayed skip calculation indicator 513 during the first systolic interval of a multiply-delayed-accumulate operation to be stored in a second skip calculation register 514, which can provide a stored skip calculation indicator 540 that may be used by a selector 516 during the second systolic interval of the multiply-delayed-accumulate operation.

The data register 504 may be configured to store the input data element 222 or skip storing of the input data element 222 and provide a stored input data element 528 during a first systolic interval based on the skip calculation indicator 526 for a current multiply-delayed-accumulate operation. For example, if the skip calculation indicator 526 is "0", the data register 504 may store a new value for the input data element 222, and if the skip calculation indicator 526 is "1", the data register 504 may skip storing the new value for the input data element 222. According to certain examples, skipping the storing of the new value by the data register 504 may result in not toggling the stored input data element 528 and holding the previous value of the stored input data element 528.

The weight register 506 may be configured to store the weight 224, or skip storing of the weight 224 during a first systolic interval to provide a stored weight value 530 based on the skip calculation indicator 526 for the current multiply-delayed-accumulate operation. For example, if the skip calculation indicator 526 is "0", the weight register 506 may store a new value for the weight 224, and if the skip calculation indicator 526 is "1", the weight register 506 may skip storing the new value for the weight 224. According to certain examples, skipping the storing of the new value by the weight register 506 may result in not toggling the stored weight value 530 and holding the previous value of the stored weight value 530.

The multiplier 508 may be configured to perform a multiplication operation between the stored input data element 528 and the stored weight value 530 to provide a multiplication result 532 during a first systolic interval of a multiply-delayed-accumulate operation. In some implementations, when a value of either the input data element 222, or the weight 224 for a current multiply-delayed-accumulate operation is zero, storing of both the input data element 222 and the weight 224 in the data register 504 and the weight register 506 respectively can be skipped using the skip calculation indicator 526. For example, the zero data element indicator 226 or the zero weight indicator 228 may generate a value of "1" for the skip calculation indicator 526, which can disable loading of the respective inputs into the data register 504 and the weight register 506. In this case, the stored input data element 528 and the stored weight value 530 may hold their values from the previous operation and may not toggle. Thus, the multiplication result 532 may not change during the first systolic interval, and the dynamic power consumption can be reduced. Since the multiplication result 532 may not be accurate for the current operation, the multiplication result 532 is not propagated to other PEs in the array.

A delay register 535 can temporarily store the multiplication result 532 generated by the multiplier 508 during a first systolic interval of a multiply-delayed-accumulate operation for delayed use by the adder 510 during a subsequent systolic interval of the multiply-delayed-accumulate operation. For example, during the first systolic interval, the delay register 535 can store a first multiplication result 532 generated by the multiplier 508. During a second systolic interval that follows the first systolic interval, the delay register 535 can provide the stored first multiplication result 533 to the adder 510 and store a second multiplication result 532 generated by the multiplier 508. During a third systolic interval that follows the second systolic interval, the delay register 535 can provide the stored second multiplication result 533 to the adder 510 and store a third multiplication result 532 generated by the multiplier 508.

The delay register 535 can be enabled during operational, non-zero conditions. If a zero is provided as an input data element or as a weight preceding a first systolic interval, then the delay register 535 can skip writing the multiplication result 532 received from the output of the multiplier 508 during the first systolic interval. A delayed skip calculation indicator 513 can be used to activate the delay register 535 during non-skip conditions. The delayed skip calculation indicator 513 can disable or skip writing to the delay register during skip conditions.

The PE 00 may receive an input partial sum 534 during the first systolic interval, and the partial input sum 534 may be stored in an input partial sum register 512 to provide a stored input partial sum 536 during the second systolic interval of a multiply-delayed-accumulate operation. The adder 510 may be configured to perform an addition operation on the multiplication result 532 and the stored input partial sum 536 to provide an addition result 538 during the second systolic interval.

The selector 516 may be configured to select either the addition result 538 or the stored input partial sum 536 based on the stored skip calculation indicator 540 to provide an output partial sum 542 via a sixth port during the second systolic interval. According to some examples, when a value of either the input data element 222 or the weight 224 for a multiply operation in a current multiply-delayed-accumulate operation is zero, the addition result 538 may not provide a correct result for the delayed-accumulate operation in the current multiply-delayed-accumulate operation during the second systolic interval since the multiplication result 532 may hold a value for the previous multiply operation. In such cases, the stored skip calculation indicator 540 may allow bypassing the addition result 538, and select the stored input partial sum 536 during the second systolic interval to provide the output partial sum 542. For example, when the stored skip calculation indicator 540 is "1", the stored input partial sum 536 may be selected as the output partial sum 542, and when the stored skip calculation indicator 540 is "0", the addition result 538 may be selected as the output partial sum 542. The selector 516 may be implemented using a multiplexer, or any suitable circuit.

In some examples, generation of the skip calculation indicator 526 may also be based on a value of an operation to be executed by the PE 00 as determined by the opcode 230 (not shown in FIG. 5). For example, for a NOP, the data register 504 and the weight register 506 can hold their values from a previous operation using the skip calculation indicator 526, thus reducing power consumption. The selector 516 may select the stored input partial sum 536 as the output partial sum 542 instead of the addition result 538 during a second systolic interval of the multiply-delayed-accumulate operation.

The zero data element indicator register 518 may be configured to store the received zero data element indicator 226 to provide a stored zero data element indicator 544 to the neighboring PE 01 in the first row in the next time period.

The zero weight indicator register 524 may be configured to store the received zero weight indicator 228 to provide a stored zero weight indicator 550 to the neighboring PE 01 in the first row in the next time period.

The output data register 520 may be configured to store the received input data element 222 to provide a delayed input data element 546 to the neighboring PE 01 in the first row in the next time period.

The output weight register 522 may be configured to store the received weight 224 to provide a delayed weight value 548 to the neighboring PE 01 in the first row in the next time period.

The stored zero data element indicator 544, the stored zero weight indicator 550, the delayed input data element 546, and the delayed weight value 548 may be provided to the PE 01 via the row output bus 108 as discussed with reference to FIG. 1. In some examples, the control signals received by the PE 00 from external circuitries may also be cached in the PE 00 and provided to the PE 01 via the row output bus 108. Thus, the respective input data element, weight value, zero data element indicator, and the zero weight indicator received by each PE every systolic interval may be cached in the respective PE, and the cached (delayed) values may be passed to the next neighboring PE in the next systolic interval.

The stored zero data element indicator 544, the stored zero weight indicator 550, the delayed input data element 546, and the delayed weight value 548 may be received by the PE 01 as the zero data element indicator, the zero weight indicator, the input data element, and the weight respectively via the row input bus 102. The PE 01 may perform the arithmetic computations on the delayed input data element 546, and the delayed weight value 548 according to certain examples. The PE 01 may skip the multiplication operation if the delayed input data element 546, or the delayed weight value 548 includes a zero value based on the stored zero data element indicator 544 and the stored zero weight indicator 550, thus optimizing the dynamic power consumption of the PE 01. The PE 01 may store the stored zero data element indicator 544, the stored zero weight indicator 550, the delayed input data element 546, and the delayed weight value 548 in respective registers in the PE 01, and pass the delayed values to the neighboring PE 02 in the next time period.

Thus, the input dataset0 may be fed, one input data element every time period, into the first row of the systolic array 302, and passed sequentially from the PE 00 to the PE 0y. As the input data element 222 passes through a PE, the stored input data element 528 can be multiplied with the stored weight value 530 during a first systolic interval and accumulated with the stored input partial sum 536 by the adder 510 during a second systolic interval. If either the input data element 222 or the weight 224 is zero, the inputs to the multiplier 508 may not change to reduce power consumption, and the stored input partial sum 536 may be provided as the output partial sum 542 via the column output bus 106. The output partial sum 542 of the PE 00 may be passed on as the input partial sum 534 for the neighboring PE 10 in the second row. The same operations may be repeated by each row of the systolic array 302 and corresponding output datasets may be generated.

Figure 6:
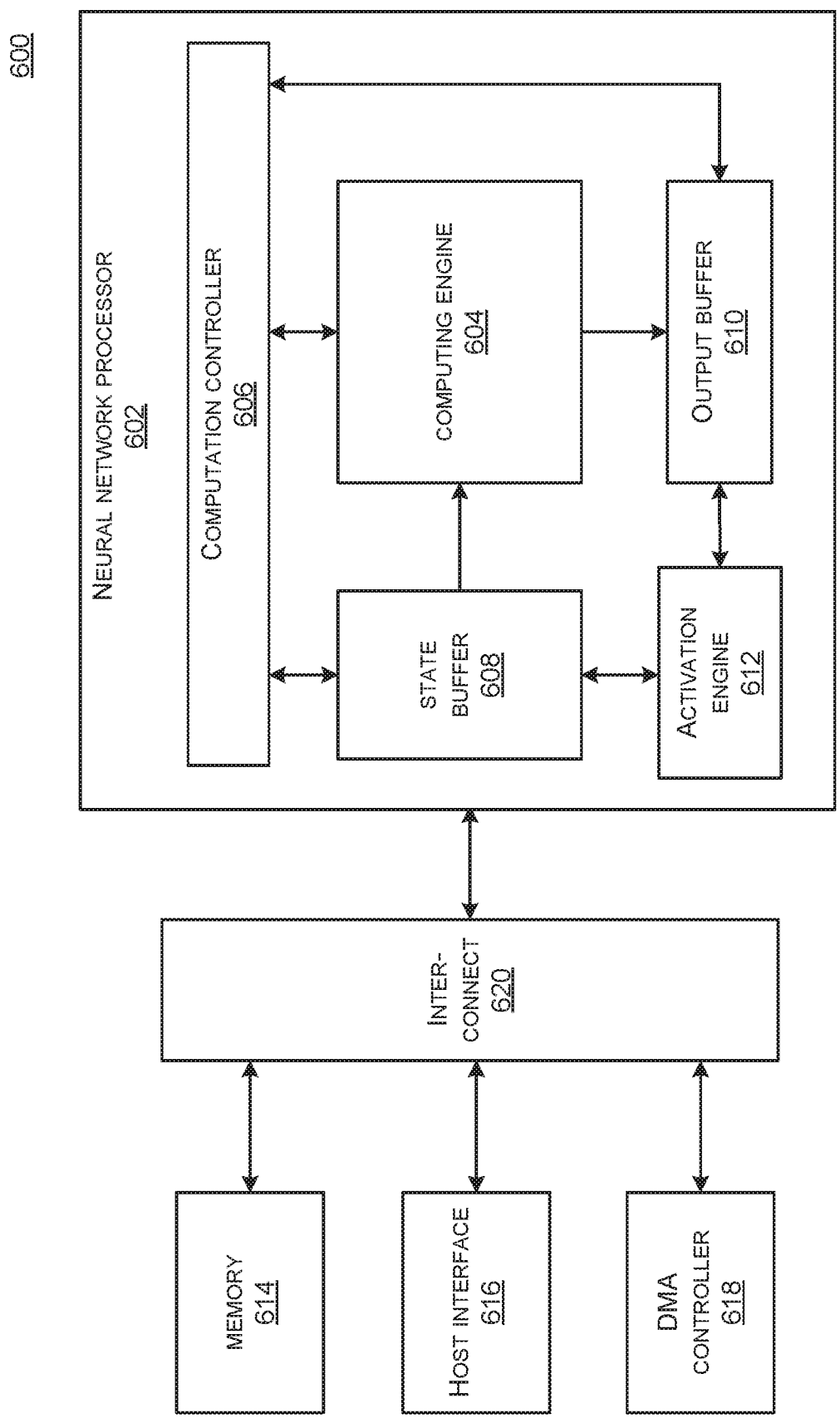
FIG. 6 shows an apparatus for neural network computations according to some examples of the disclosed technologies.

FIG. 6 shows an apparatus 600 for neural network computations according to some examples of the disclosed technologies. The apparatus 600 may be part of a computer system, e.g., a host server. For example, the host server may provide multi-tenant compute services for data processing applications such as an image recognition service, text-based data processing (e.g., processing of search queries), audio data processing, video data processing, etc. In some examples, a host device may operate a software application and communicate with the apparatus 600 to make a prediction based on computations with a prediction model utilizing a neural network processor. For example, the host device can make the prediction by identifying information included in an input data set for an image, text, audio, video, etc. using the prediction model.

The apparatus 600 may include a neural network processor 602 coupled to memory 614, a host interface 616, and a direct memory access (DMA) controller 618 via an interconnect 620. The neural network processor 602 may include a computing engine 604, a computation controller 606, a state buffer 608, an output buffer 610, and an activation engine 612. The neural network processor 602 can provide the computing resources to support the computations with the prediction model. The neural network processor 602 may be implemented as a system on chip (SoC), a field programmable gate array (FPGA), or any suitable circuit.

The memory 614 may be configured to store instructions, input data sets (e.g., pixel data of an image) and the weights (e.g., weights corresponding to certain visual and/or nonvisual features) received from the host device. The memory 614 may also be configured to store outputs of the neural network processor 602 (e.g., one or more image recognition decisions on the input images in the form of output data sets). The memory 614 may include any suitable memory, e.g., dynamic random access memory (DRAM), synchronous DRAM (SDRAM), double data rate DRAM (DDR DRAM), storage class memory (SCM), flash memory, etc.

The host interface 616 may be configured to enable communication between the host device and the neural network processor 602. For example, the host interface 616 may be configured to transmit memory descriptors including the memory addresses of the stored data (e.g., input data sets, weights, results of computations, etc.) between the host device and the neural network processor 602. The host interface 616 may include, e.g., a peripheral component interconnect express (PCIe) interface, or any suitable interface for communicating with the host device. The host device may include a host processor and a host memory.

The DMA controller 618 may be configured to perform DMA operations to transfer data between the neural network processor 602 and the host device. For example, as discussed above, the host device can store the instructions, input data sets, and the weights in the memory 614. The host device can provide the memory addresses for the stored instructions, data, and the weights to the neural network processor 602 (e.g., in the form of memory descriptors). The neural network processor 602 can then obtain the stored instructions, data, and the weights based on the memory addresses provided by the host device. The neural network processor 602 can also store the results of computations (e.g., one or more image recognition decisions) in the memory 614, and provide the memory addresses for the stored results to the host device.

The state buffer 608 may be configured to provide caching of data used for computations at the computing engine 604. The data cached at the state buffer 608 may include, e.g., the input data sets and the weights acquired from the memory 614, as well as intermediate outputs of computations at the computing engine 604. The caching can reduce the effect of memory access bottleneck (e.g., caused by the latencies at the memory 614, the DMA controller 618, the interconnect 620, etc.) on the performance of the computing engine 604. The state buffer 608 can be an on-chip memory device and may include a static random access memory (SRAM) or any suitable memory.

The computation controller 606 may be configured to provide controls to various components of the neural network processor 602 to perform neural network computations. In some implementations, the computation controller 606 may read the instructions stored in the memory 614 and schedule the executions of the instructions by the computing engine 604. In the first example, the computation controller 606 may perform scheduling of loading the weights into the computing engine 604 prior to reading the input data elements from the state buffer 608. For example, as discussed with reference to FIG. 2 and FIG. 4, the computation controller 606 may provide the opcode 230 and the weight load signal 232 to the computing engine 604 based on the instructions received from the host device. The computation controller 606 may provide appropriate values of the opcode 230 to the computing engine 604 which may be decoded by each PE in the computing engine to perform a corresponding operation. For example, the computing engine 604 may use the weight load signal 232 and the opcode 230 to pre-load the weights in all the PEs in the computing engine 604. Once the weights have been pre-loaded, the computation controller 606 may perform scheduling of loading the input data elements into the computing engine 604, sequentially, in systolic intervals, from the state buffer 608 to start the arithmetic computations.

In the second example, the computation controller 606 may perform scheduling of loading the weights and the input data elements into the computing engine 604, sequentially, in systolic intervals, from the state buffer 608. The computation controller 606 may schedule loading of the weights and the input data elements in a respective first PE of each row in the systolic array 302 using a respective row data bus. For example, a respective input data element and a weight value may be loaded per cycle in the first PE of the respective row.

In another example, the computation controller 606 may schedule loading of the weights in the systolic array 302 in parallel for each row using a respective column data bus for each PE in a given row. For example, weights for each row may be loaded in parallel per cycle. In some implementations, the computation controller 606 may determine a data type for the input data set based on the instructions received from the host device. The instructions may be in the form of an opcode. The data type may indicate a size and a type of the input data element, e.g., 4-bit, 8-bit, 16-bit, signed, unsigned, or floating point.

The computing engine 604 may be configured to perform computations for the neural network. In some examples, the computing engine 604 may include a set of PEs configured to perform one or more arithmetic operations involved in the neural network computations. Each PE may perform multiply-accumulate operations using input data sets and associated weights. For example, the computing engine 604 may include the systolic array 302, and the circuit 304 comprising the zero input data detectors 306*a*-306*x*, and the zero weight detectors 308a-308x. In some examples, the zero input data detectors 306a-306x, and the zero weight detectors 308a-308x may be external to the computing engine 604. The computing engine 604 may execute instructions as scheduled by the computation controller 606 to load the weights and the input datasets sequentially from the state buffer 608 into the computing engine 604.

In the first example, the weights may be pre-loaded prior to reading the input datasets from the state buffer 608, as discussed with reference to FIG. 4. The respective zero weight indicators corresponding to each weight may be cached locally in each PE and the cached values may be used to perform arithmetic computations with the respective input data element as the input data element is fed into the computing engine 604 along with the corresponding zero data element indicator. In the second example, the weights and the input datasets may be read simultaneously from the state buffer 608, as discussed with reference to FIG. 5. The corresponding zero data element indicator and the zero weight indicator may be provided by the respective zero detector circuits and propagated sequentially from one PE to another for the respective row. The weights and the input datasets can be obtained from the state buffer 608 using one or more interfaces. In certain examples, the computing engine 604 may perform the arithmetic computations to reduce the dynamic power consumption of the systolic array 302 using the respective zero data element indicator and the zero weight indicator signals as discussed with reference to FIGS. 2-5, and provide the computations results to be stored in the output buffer 610.

The output buffer 610 may include a set of registers to store the output data sets generated by the computing engine 604. In some implementations, the output buffer 610 may also enable additional processing such as, e.g., a pooling operation to reduce the size of the stored outputs. In some implementations, the computing engine 604 can be operated to perform computations for a particular neural network layer, and the output buffer 610 can process the outputs of that neural network layer and store the processed output datasets (with or without processing by the activation engine 612) at the state buffer 608. The processed output datasets may be used by the computing engine 604 as the intermediate outputs. In some examples, the output buffer 610 may include adders to accumulate the partial sums generated for different sets of filters and input data sets to generate a convolution output array. The final output value of the convolution output array stored in the state buffer 608 can be retrieved by the computation controller 606 for storing at the state buffer 608.

The activation engine 612 may be configured to apply one or more activation functions (e.g., ReLu function) on the output of the output buffer 610. For example, the activation engine 612 may include one or more lookup tables (e.g., in the form of multiplexer circuits) that can map the input to one of the candidate outputs representing the result of applying the activation function to the input. In some examples, the activation engine 612 may also include a bypass path to allow outputs from the output buffer 610 to be stored directly at the state buffer 608 when activation functions are not to be applied.

Figure 7:
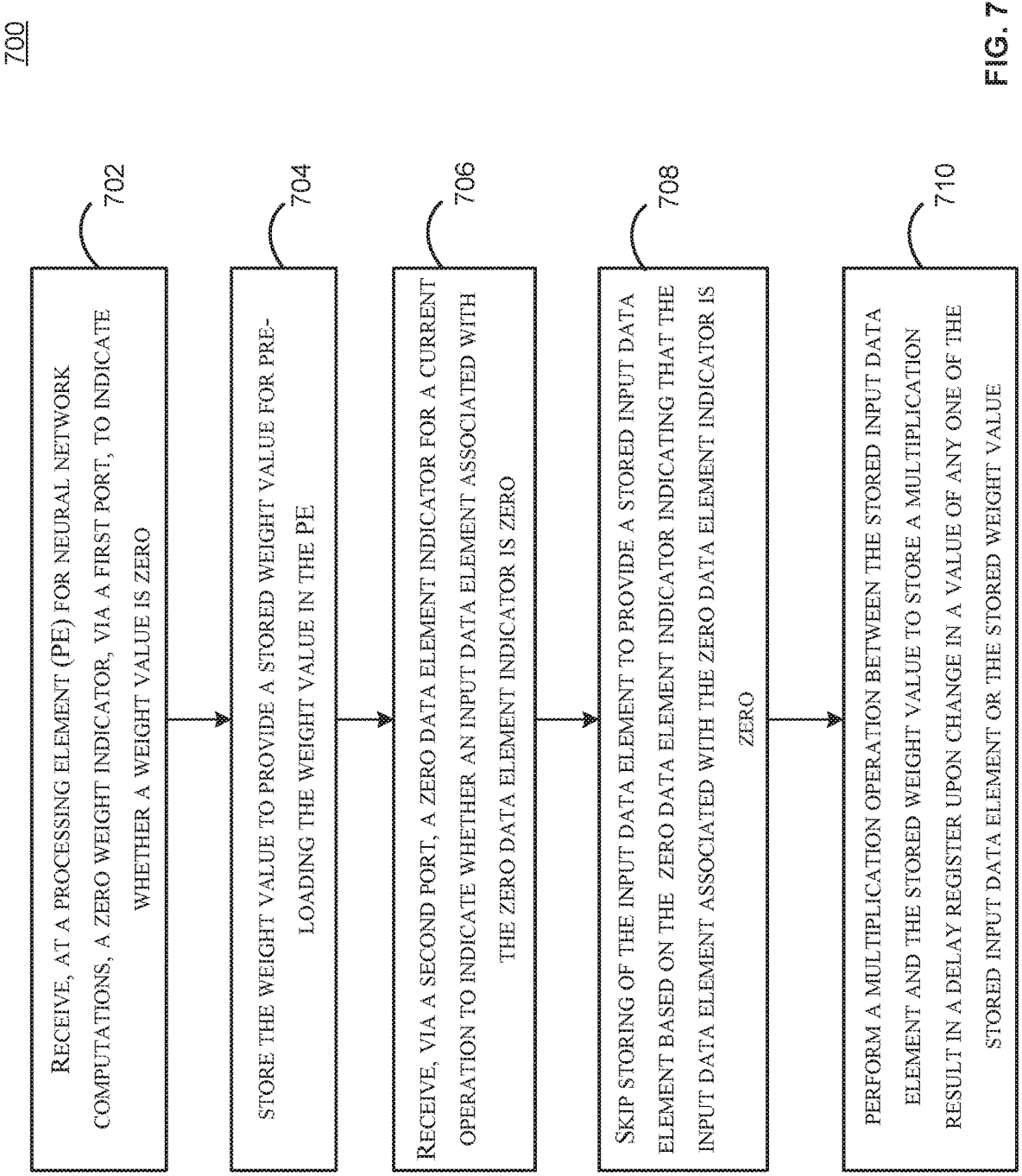
FIG. 7 shows a method executed by a processing element for neural network computations, according to some examples of the disclosed technologies.

FIG. 7 shows a method 700 executed by a PE for neural network computations, according to some examples of the disclosed technologies. The PE may be part of the systolic array 302, e.g., the PE 00. The systolic array 302 may be part of the computing engine 604.

In a step 702, the PE may receive a zero weight indicator, via a first port, to indicate whether a weight value is zero. For example, the PE 00 may include means to receive the zero weight indicator 228 to indicate that the weight 224 is zero. The weight 224 may have been received from the host device into the memory 614. The PE 00 may receive the zero weight indicator 228 from the first zero weight detector 308a via the row input bus 102. As discussed with reference to FIG. 3, the first zero weight detector 308a may include comparators or other circuits to determine that the weight 224 is zero. For example, the first zero weight detector 308a may set the zero weight indicator 228 to "1" when it detects that the weight 224 is zero. The computation controller 606 may schedule loading of the weight 224 corresponding to the filter0, sequentially, in systolic intervals, from the state buffer 608 into the PE 00 of the computing engine 604 prior to scheduling loading of the input data elements into the PE 00.

In a step 704, the PE may store the weight value to provide a stored weight value for pre-loading the weight value in the PE. For example, the PE 00 may include means for preloading the weight 224 in the PE 00. The computation controller 606 may provide the opcode 230 to the computing engine 604 with a certain opcode value for loading the respective weights in each PE of the computing engine 604. As discussed with reference to FIG. 2, the weight 224 may be stored in the cached weight register 220 using the weight load signal 232. The cached weight 246 previously loaded into the cache register 220 may be shifted into the weight register 206 at the start of the arithmetic computations based on the start computations signal 260. The stored weight value 248 may be used to perform arithmetic computations with the stored input data element 244.

In a step 706, the PE may receive, via a second port, a zero data element indicator for a current operation to indicate whether an input data element associated with the zero data element indicator is zero. For example, the PE 00 may include means to receive the zero data element indicator 226 to indicate that the input data element 222 associated with the zero data element indicator 226 is zero. As discussed with reference to FIG. 3, the PE 00 may receive the zero data element indicator 226 via the second port from the first zero input data detector 306a using the row input bus 102. The first zero input data detector 306a may include comparators or other circuits to determine that the input data element 222 is zero. For example, the first zero input data detector 306a may set the zero data element indicator 226 to '1' when it detects that the input data element 222 associated with the zero data element indicator 226 is zero. The input data element 222 may correspond to an input data set, e.g., the input dataset0. In one instance, the input dataset0 may belong to a dataset received from a host device into the memory 614 to perform data processing. In another instance, the input dataset0 may belong to an intermediate output generated by the computing engine 604, which have gone through an activation function in the activation engine 612. The computation controller 606 may schedule loading of the input data elements corresponding to the input dataset0, sequentially, in systolic intervals, from the state buffer 608 into the PE 00 of the computing engine 604 after loading of the weights into the systolic array.

In a step 708, the PE may skip storing of the input data element to provide a stored input data element based on the zero data element indicator indicating that the input data element associated with the zero data element indicator is zero. For example, the PE 00 may include means to skip storing of the input data element 222 to provide the stored input data element 244 based on the zero data element indicator 226 indicating that the input data element 222 associated with the zero data element indicator 226 is zero. Referring back to FIG. 4, the PE 00 may include the data element load generator 202 to generate the data load signal 242, which can be used to skip storing of the input data element 222 in the data register 204. For example, when the zero data element indicator 226 or the NOP 258 is asserted, storing of the input data element 222 in the data register 204 can be skipped. In some examples, the data element load generator 202 may include a NOR circuit to perform a NOR operation to set the data load signal 242 to "0" when the zero data element indicator 226 is "1", or the NOP 258 is "1." The data load signal 242 may be used to disable the loading of the input data element 222 in the data register 204 under certain conditions and therefore the stored input data element 244 may hold a value from the previous operation.

In a step 710, the PE may perform a multiplication operation between the stored input data element and the stored weight value to store a multiplication result in a delay register upon change in a value of any one of the stored input data element or the stored weight value. For example, the PE 00 may include means to perform a multiplication operation between the stored input data element 244 and the stored weight value 248 to generate the multiplication result 250 and write multiplication result in a delay register 251 upon a change in a value of the stored input data element 244 or the stored weight value 248. Referring back to FIG. 4, the PE 00 may include the multiplier 208 to perform the multiplication operation between the stored input data element 244 and the stored weight value 248 to generate the multiplication result 250 and write multiplication result in a delay register 251. The multiplier 208 may perform the multiplication during a first systolic interval upon a change in a value of either the stored input data element 244 in the data register 204, or the stored weight value 248 in the weight register 206. As discussed previously, the value of the stored input data element 244 in the data register 204 may change based on the data load signal 242. For example, the data load signal 242 may disable loading a respective new value in the data register 204 when the zero data element indicator 226 or the NOP 258 is asserted, which may avoid toggling the stored input data element 244. Since the weight 224 has been pre-loaded in the PE 00, the stored weight value 248 does not change during the computations. Thus, dynamic power consumption can be reduced which may have occurred as a result of a multiplication operation performed by the multiplier 208.

Examples of the disclosed technologies can provide systems and methods to reduce dynamic power consumption in the PEs using zero detector circuits by skipping multiplication operations with a zero value on the input data element. Additionally, use of the respective zero detector circuits for detecting zeros on the input data elements and the weights entering each row of the systolic array, and passing the zero indicators to all the PEs in the array can minimize the gate count and power consumption as compared to using respective zero detectors within each PE in the array.

Figure 8:
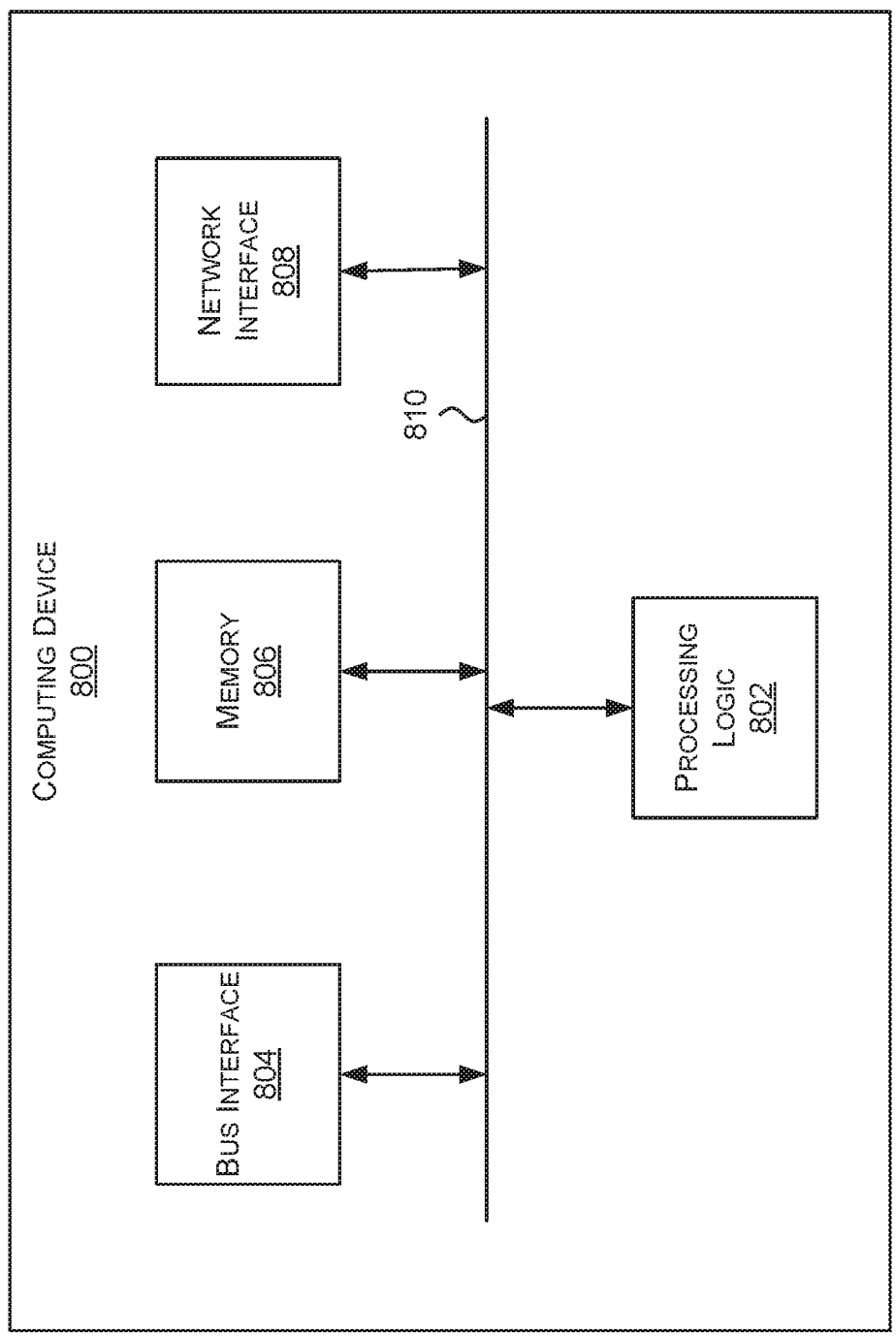
FIG. 8 illustrates an example of a computing device, according to certain aspects of the disclosure.

FIG. 8 illustrates an example of a computing device 800. Functionality and/or several components of the computing device 800 may be used without limitation with other examples disclosed elsewhere in this disclosure, without limitations. A computing device 800 may perform computations to facilitate processing of a task. As an illustrative example, computing device 800 can be part of a server in a multi-tenant compute service system. Various hardware and software resources of computing device 800 (e.g., the hardware and software resources associated with data processing) can be allocated to a client upon request.

In one example, the computing device 800 may include processing logic 802, a bus interface module 804, memory 806, and a network interface module 808. These modules may be hardware modules, software modules, or a combination of hardware and software. In certain instances, modules may be interchangeably used with components or engines, without deviating from the scope of the disclosure. The computing device 800 may include additional modules, which are not illustrated here for the ease of illustration. In some implementations, the computing device 800 may include fewer modules. In some implementations, one or more of the modules may be combined into one module. One or more of the modules may be in communication with each other over a communication channel 810. The communication channel 810 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 806. The processing logic 802 may also include hardware circuities for performing artificial neural network computations including, for example, the neural network processor 602, etc.

The access to the processing logic 802 can be granted to a client to provide the personal assistant service requested by the client. For example, the computing device 800 may host a virtual machine, on which an image recognition software application can be executed. The image recognition software application, upon execution, may access the processing logic 802 to predict, for example, an object included in an image. As another example, access to the processing logic 802 can also be granted as part of bare-metal instance, in which an image recognition software application executing on a client device (e.g., a remote computer, a smart phone, etc.) can directly access the processing logic 802 to perform the recognition of an image.

The memory 806 may include either volatile or non-volatile, or both volatile and nonvolatile types of memory. The memory 806 may, for example, include random access memory (RAM), read only memory (ROM), Electrically Erasable Programmable Read-Only Memory (EEPROM), flash memory, and/or some other suitable storage media. In some cases, some or all of the memory 806 may be internal to the computing device 800, while in other cases some or all of the memory may be external to the computing device 800. The memory 806 may store an operating system comprising executable instructions that, when executed by the processing logic 802, provides the execution environment for executing instructions providing functionality to perform convolution computations for the computing device 800. The memory 806 may also store, for example, software applications for performing artificial neural network computations. The memory may also store and maintain several data structures and tables for facilitating the functionality of the computing device 800.

The bus interface module 804 may enable communication with external entities, such as a host device and/or other components in a computing system, over an external communication medium. The bus interface module 804 may include a physical interface for connecting to a cable, socket, port, or other connection to the external communication medium. The bus interface module 804 may further include hardware and/or software to manage incoming and outgoing transactions. The bus interface module 804 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 804 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 808 may include hardware and/or software for communicating with a network. This network interface module 808 may, for example, include physical connectors or physical ports for wired connection to a network, and/or antennas for wireless communication to a network. The network interface module 808 may further include hardware and/or software configured to implement a network protocol stack. The network interface module 808 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc. In some examples, the computing device 800 may receive a set of parameters, such as the aforementioned weight values for convolution computations, from a server through network interface module 808.

The various components and modules of the computing device 800, described above, may be implemented as discrete components, as a System on a Chip (SoC), as an ASIC, as an NPU, as an FPGA, or any combination thereof. In some examples, the SoC or other component may be communicatively coupled to another computing system to provide various services such as traffic monitoring, traffic shaping, computing, etc. In some examples of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The term "or" is used in its inclusive sense (and not in its exclusive sense) so that when used, for example, to connect a list of elements, the term "or" means one, some, or all of the elements in the list. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A systolic multiply accumulate processor comprising:
  a systolic array of processing elements arranged in a first plurality of rows and a second plurality of columns, the systolic array of processing elements configured to operate on input data sets, wherein each processing element of the processing elements comprises:
    a set of input ports for receiving, for each clock cycle of a set of clock cycles, i) an input data element contributing to an output partial sum for a subsequent clock cycle of the set of clock cycles, and ii) an input partial sum contributing to an output partial sum for a current clock cycle of the set of clock cycles, wherein the set of input ports comprise a first input port for receiving the input data element and a second input port for receiving the input partial sum;
    a third input port for receiving a weight value;
    an output port for providing an output partial sum;
    a multiplier coupled to the first and third input ports and configured to, for each clock cycle of the set of clock cycles, multiply the input data element received during the current clock cycle by the weight value to generate a product for the current clock cycle;
    a delay register coupled to the multiplier, the delay register configured to store the product generated by the multiplier for each clock cycle of the set of clock cycles until the subsequent clock cycle; and
    an adder coupled to the delay register, the second input port and the output port, the adder configured to, for each clock cycle of the set of clock cycles:
      obtain a product as generated by the multiplier of the processing element during a prior clock cycle and stored within the delay register, and
      generate the output partial sum by adding i) the product generated by the multiplier of the processing element during the prior clock cycle and stored within the delay register to ii) the input partial sum received by the processing element during the current clock cycle, wherein the input data element and the input partial sum are received by the processing element during the current clock cycle and contribute respectively to output partial sums generated by the adder during different clock cycles.

2. The systolic multiply accumulate processor of claim 1, wherein each processing element of the processing elements further comprises:
  a first data register configured to, for each clock cycle of the set of clock cycles, store the input data element received during the current clock cycle;
  a second output port coupled to an output of the first data register;
  a weight register configured to store the weight value; and
  a third output port coupled to an output of the weight register.

3. The systolic multiply accumulate processor of claim 1, further comprising:
  a skip calculation generator configured to disable writing of the delay register under one or more conditions.

4. The systolic multiply accumulate processor of claim 3, wherein the one or more conditions include one or more of:
  the weight value is zero;
  the input data element is zero; or
  a no-operation (NOP) instruction is received.

5. The systolic multiply accumulate processor of claim 1, further comprising:
  a skip calculation generator configured to disable the adder during the current clock cycle in response to a skip condition detected during the prior clock cycle.

6. A systolic circuit comprising:
  a plurality of processing elements coupled in a systolic array, each processing element in the plurality of processing elements comprising:
    one or more inputs for receiving, for each systolic interval of a set of systolic intervals, i) a first number contributing to an output for a subsequent systolic interval of the set of systolic intervals, and ii) a second number contributing to an output for a current systolic interval of the set of systolic intervals;
    a multiplier configured, on each systolic interval, to calculate a product by multiplying the first number received during the current systolic interval by a third number;
    a delay register configured, on each systolic interval, to store the product calculated by the multiplier for the current systolic interval; and
    an adder configured, on each systolic interval, to add a product stored in the delay register, as calculated by the multiplier of the processing element during a prior systolic interval, to the second number received by the processing element during the current systolic interval to provide the output, wherein the first number and the second number are received by the processing element during the current systolic interval and contribute respectively to outputs of the adder generated during different systolic intervals,
  wherein each processing element in the plurality of processing elements is configured to communicate data with at least one neighboring processing element in the plurality of processing elements.

7. The systolic circuit of claim 6, wherein:
  the current systolic interval immediately follows the prior systolic interval; and
  the prior systolic interval and the current systolic interval are identical lengths of time.

8. The systolic circuit of claim 6, wherein each processing element in the plurality of processing elements further comprises:
  a data register coupled to the multiplier, wherein the data register is configured to store a new value for the first number during each systolic interval; and an input partial sum register coupled to the adder, wherein the input partial sum register is configured to store a new value for the second number during each systolic interval.

9. The systolic circuit of claim 6, wherein the multiplier and the adder are each configured to perform at least floating point computations or other non-integer computations.

10. The systolic circuit of claim 6, wherein each processing element in the plurality of processing elements further comprises:
a skip calculation generator configured to disable writing of the delay register under one or more skip conditions.

11. The systolic circuit of claim 10, wherein the one or more skip conditions include one or more of:
the first number is zero;
the third number is zero; or
a no-operation (NOP) instruction is received.

12. The systolic circuit of claim 10, wherein the skip calculation generator is further configured to, in response to detecting that a first number received during a first systolic interval is zero:
disable the multiplier to skip performing a multiplication during the first systolic interval; and
disable writing of the delay register to skip writing a product to the delay register.

13. The systolic circuit of claim 10, wherein the skip calculation generator is further configured to, in response to detecting that a first number received during a first systolic interval is zero:
disable the adder to skip performing an addition during a second systolic interval; and
select a second number received during the second systolic interval for output instead of selecting a sum from the adder during the second systolic interval.

14. A method comprising:
receiving, for each systolic interval of a set of systolic intervals, i) an input data element contributing to an output for a subsequent systolic interval of the set of systolic intervals, and ii) an input partial sum contributing to an output for a current systolic interval of the set of systolic intervals;
multiplying, on each systolic interval, using a first processing element, a first input data element received during the current systolic interval by a first weight value stored in a first weight register to calculate a first product;
writing, on each systolic interval, the first product as calculated for the current systolic interval to a first delay register in the first processing element;
reading, on each systolic interval, a product stored in the first delay register, as calculated during a prior systolic interval; and
adding, on each systolic interval, using the first processing element, the product stored in the first delay register, as calculated during the prior systolic interval, to a first input partial sum received during the current systolic interval to generate a first output partial sum, wherein the first input data element and the first input partial sum are received by the first processing element during the current systolic interval and contribute respectively to output partial sums generated by the first processing element during different systolic intervals.

15. The method of claim 14, further comprising:
multiplying, using the first processing element, a second input data element received during a first systolic interval subsequent to the current systolic interval by the first weight value to calculate a second product; and
writing the second product as calculated for the first systolic interval to the first delay register,
wherein the multiplying of the second input data element and adding of the first product are performed during at least partially overlapping periods of time.

16. The method of claim 15, further comprising:
multiplying, using the first processing element, a third input data element received during a second systolic interval subsequent to the current systolic interval by the first weight value to calculate a third product;
writing the third product as calculated for the second systolic interval to the first delay register; and
adding, using the first processing element, the second product as stored in the first delay register and as calculated for the first systolic interval to a second input partial sum received during the second systolic interval to generate a second output partial sum.

17. The method of claim 16, further comprising:
multiplying, using a second processing element, a fourth input data element received during the first systolic interval by a second weight value to calculate a fourth product;
writing the fourth product as calculated for the first systolic interval to a second delay register in the second processing element;
receiving the first output partial sum from the first processing element as a third input partial sum to the second processing element during the second systolic interval; and
adding, using the second processing element, the fourth product as stored in the second delay register and as calculated for the first systolic interval to the third input partial sum as received during the second systolic interval to generate a third output partial sum.

18. The method of claim 16, further comprising:
receiving, by a third processing element, the first input data element during the first systolic interval;
multiplying, using the third processing element, the first input data element as received by the third processing element during the first systolic interval by a third weight value to calculate a fifth product;
writing the fifth product as calculated for the first systolic interval to a third delay register in the third processing element;
receiving, by the third processing element, a third input partial sum during the second systolic interval; and
adding, using the third processing element, the fifth product stored in the third delay register, as calculated for the first systolic interval to the third input partial sum as received during the second systolic interval to generate a fourth output partial sum.

19. The method of claim 14, further comprising:
detecting a skip condition by the first processing element during a particular systolic interval; and
disabling writing of the first delay register during the particular systolic interval.

20. The method of claim 19, further comprising:
in response to detecting the skip condition by the first processing element during the particular systolic interval, disabling an adder of the first processing element in a systolic interval subsequent to the particular systolic interval.

* * * * *